(12) United States Patent
Shinjo et al.

(10) Patent No.: US 9,289,835 B2
(45) Date of Patent: Mar. 22, 2016

(54) CUTTING INSERT AND ROTARY CUTTING TOOL

(71) Applicant: TUNGALOY CORPORATION, Iwaki-shi, Fukushima (JP)

(72) Inventors: Yuji Shinjo, Iwaki (JP); Isamu Saito, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 420 days.

(21) Appl. No.: 13/754,483

(22) Filed: Jan. 30, 2013

(65) Prior Publication Data

US 2013/0142578 A1    Jun. 6, 2013

Related U.S. Application Data

(63) Continuation-in-part of application No. PCT/JP2012/069227, filed on Jul. 27, 2012.

(30) Foreign Application Priority Data

Jul. 29, 2011    (JP) .................. 2011-166206

(51) Int. Cl.
| | | |
|---|---|---|
| *B23F 1/06* | (2006.01) | |
| *B23C 5/20* | (2006.01) | |
| *B23F 21/14* | (2006.01) | |

(52) U.S. Cl.
CPC .............. *B23C 5/207* (2013.01); *B23F 21/146* (2013.01); *B23C 2200/086* (2013.01); *B23C 2200/203* (2013.01); *B23C 2200/367* (2013.01); *B23C 2210/168* (2013.01); *Y10T 407/2208* (2015.01)

(58) Field of Classification Search
CPC ........... Y10T 407/23; Y10T 407/1924; Y10T 407/1745; Y10T 407/1735; Y10T 407/1715; Y10T 407/1725; B23C 5/207; B23C 5/2221; B23C 5/2213; B23F 21/126; B23F 21/128; B23F 21/143; B23F 21/146; B23F 21/163; B23F 21/166
USPC ............................ 407/113, 42, 29, 27, 23, 25
See application file for complete search history.

(56) References Cited

U.S. PATENT DOCUMENTS

| | | |
|---|---|---|
| 1,472,960 A | 11/1923 | Conklin |
| 3,762,005 A | 10/1973 | Erkfritz |

(Continued)

FOREIGN PATENT DOCUMENTS

| | | |
|---|---|---|
| CA | 943749 A1 | 3/1974 |
| JP | 58 177215 U | 11/1983 |
| JP | 2005-066780 | 3/2005 |
| WO | WO 2010021463 A2 * | 2/2010 |

OTHER PUBLICATIONS

Extended European search report dated Jan. 29, 2015 issued in EP counterpart application (No. 12820470.8).

(Continued)

*Primary Examiner* — Sunil K Singh
*Assistant Examiner* — Alan Snyder
(74) *Attorney, Agent, or Firm* — Womble Carlyle

(57) ABSTRACT

A cutting insert includes a first end surface, a second end surface located opposite the first end surface and an axis extending so as to penetrate the first end surface and the second end surface. The insert includes two first cutting edges with a curve shape on a first end surface side and two second cutting edges with a curve shape on a second end surface side. Each of the first cutting edges is formed on an intersecting ridge portion between the first end surface and a corresponding side surface portion so as to curve on a plane orthogonal to the axis. Each of the second cutting edges is formed on an intersecting ridge portion between the second end surface and the corresponding side surface portion so as to curve on a plane orthogonal to the axis.

23 Claims, 19 Drawing Sheets

(56) References Cited

U.S. PATENT DOCUMENTS

| | | | |
|---|---|---|---|
| 4,417,833 A | 11/1983 | Wertheimer | |
| 5,123,786 A * | 6/1992 | Yates et al. | 407/38 |
| 6,227,772 B1 | 5/2001 | Heinloth | |
| 7,073,987 B2 * | 7/2006 | Hecht | 407/113 |
| 2002/0066352 A1 * | 6/2002 | Satran et al. | 83/839 |
| 2003/0113175 A1 | 6/2003 | Wermeister | |
| 2008/0063482 A1 * | 3/2008 | Engfer | 408/59 |
| 2009/0136304 A1 | 5/2009 | Satran et al. | |
| 2011/0255925 A1 | 10/2011 | Yoshida | |
| 2012/0301233 A1 | 11/2012 | Gesell et al. | |

OTHER PUBLICATIONS

International Preliminary Report on Patentability (IPRP) dated Feb. 4, 2014 issued in PCT counterpart application (No. PCT/JP2012/069227).

International Search Report and Written Opinion dated Aug. 21, 2012 issued in PCT counterpart application (No. PCT/JP2012/069227).

Office action dated Mar. 31, 2015 issued in Japanese counterpart application (No. 2013-526895).

* cited by examiner

CUTTING INSERT AND ROTARY CUTTING TOOL

CROSS-REFERENCE TO RELATED APPLICATIONS

This is a continuation-in-part of PCT application No. PCT/JP2012/069227, filed Jul. 27, 2012, which claims the benefit of Japanese Patent Application No. 2011-166206, filed Jul. 29, 2011. The contents of the aforementioned applications are hereby incorporated by reference in their entirety.

BACKGROUND OF THE INVENTION

1. Field of the Invention

The present invention relates to a cutting insert and a rotary cutting tool in which the cutting insert is detachably mounted. In particular, the present invention relates to a cutting insert and a rotary cutting tool which are used to form tooth spaces in a gear.

2. Description of the Related Art

An indexable rotary cutting tool is conventionally used as a cutting tool for manufacture of gears. The tool is formed by assembling, from a side end surface side of a tool body, cutting inserts into insert mounting seats arranged in opposite side end surfaces of the tool body, using clamping screws. The edge shape of the tool is the same as the shape of a tooth space in a gear. When the tool is used to carry out grooving, the edge shape is directly transferred to a workpiece as the shape of teeth.

Japanese Patent Laid-Open No. 2005-66780 discloses an example of a cutting insert for use in such a rotary cutting tool for gear cutting. Now, FIG. 26 and FIG. 27 schematically showing a cutting insert in Japanese Patent Laid-Open No. 2005-66780 are referred to. In a cutting insert 1 in FIG. 26 and FIG. 27, an intersecting ridge portion between an upper surface 2 and each side surface 3, 4 extends to a side portion 5 and is formed as a continuous smooth cutting edge. The side surface 3, 4 is formed to function as a rake face. A lower surface 6 is formed as an insert seating surface. In such a side view as shown in FIG. 27, the intersecting ridge portion between the upper surface 2 and the side surface 3, 4 is formed to appears to protrude outward of the insert. Thus, the upper surface 2 is shaped like a curved surface conforming to the protruding shape of the intersecting ridge portion. On the other hand, the lower surface 6 is flat so as to serve as the insert seating surface. The intersecting ridge portion between the upper surface 2 and each side surface 3, 4 is shaped to have an involute curve shape. Thus, the use of the cutting insert for cutting allows the involute curve shape to be transferred to the workpiece. The cutting insert includes cutting edges formed only on the upper surface side, and two cutting edges enable the involute curve shape to be transferred to the workpiece.

FIG. 28 schematically illustrates, by way of example, that the cutting inserts 1 are mounted on the opposite side end surface sides of the tool body 7 of the rotary cutting tool and that the cutting tool is rotated and is fed to the workpiece to process tooth spaces 8 in an inner gear one by one. FIG. 28 illustrates two opposite cutting inserts 1. However, in actuality, the cutting inserts 1 are displaced from each other by a predetermined distance in a circumferential direction in the tool body.

At present, there is a demand to enable more of the cutting edges of a cutting insert for gear cutting to be used to transfer the involute curve shape to the workpiece, than in the conventional art. This is because at present, an advanced technique and a high precision are required to form cutting edges shaped like the involute curve shape on the cutting insert, resulting in an increase in the manufacturing cost of the cutting insert and thus in the unit price of the cutting insert.

A possible measure for enabling the use of more cutting edges than in the conventional art is to modify the single-sided cutting insert 1 in Japanese Patent Laid-Open No. 2005-66780 into a double-sided cutting insert. The thus modified cutting insert includes cutting edges formed on the lower surface 6 side of the cutting insert 1 shown in FIG. 26 and FIG. 27. Furthermore, not only the upper surface 2 but also the lower surface 6 is shaped to protrude. The cutting insert in this form allows the use of a total of four cutting edges arranged on both the upper and lower surfaces. However, in this case, both upper surface and lower surface, serving as insert seating surfaces, are protruding curved surfaces conforming to the involute curve. To allow the thus shaped cutting insert to be mounted in the tool body, a bottom wall surface of each insert mounting seat of the tool body needs to be shaped like a recessed curved surface conforming to the involute curve. However, substantial labor and cost is required to form such a recessed curved surface on the bottom wall surface of the insert mounting seat using a cutting tool such as an end mill. Thus, such insert mounting seats are unpractical. Furthermore, even if an attempt is made to form the insert mounting seat in the above-described manner, the cutting insert may fail to be sufficiently stably mounted in the insert mounting seat of the tool body because precisely forming such a recessed curved surface on the bottom wall surface of the insert mounting seat is difficult.

SUMMARY OF THE INVENTION

An object of the present invention is to provide a cutting insert which includes cutting edges with a particular curve shape on each of the upper and lower surfaces but in which the bottom wall surface of the corresponding insert mounting seat with the cutting insert mounted therein need not have a particular curved surface corresponding to the shape of the cutting edges, as well as a cutting tool in which the cutting insert is mounted.

A first aspect of the present invention provides a cutting insert including a first end surface and a second end surface which are located opposite each other and a peripheral side surface extending between the first end surface and the second end surface and including two side surface portions, the cutting insert including an axis defined therein which extends so as to penetrate the first end surface and the second end surface, the cutting insert including two first cutting edges with a curve shape, one first cutting edge being formed so as to extend along an intersecting ridge portion between the first end surface and one side surface portion of the two side surface portions and in such a manner that the one side surface portion functions as a rake face, the other first cutting edge being formed so as to extend along an intersecting ridge portion between the first end surface and the other side surface portion of the two side surface portions and in such a manner that the other side surface portion functions as a rake face, each of the first cutting edges being formed on the intersecting ridge portion between the first end surface and the related side surface portion so as to curve in a direction orthogonal to the axis, and two second cutting edges with a curve shape, one second cutting edge being formed so as to extend along an intersecting ridge portion between the second end surface and one side surface portion of the two side surface portions and in such a manner that the one side surface portion functions as a rake face, the other second cutting edge being formed so as to extend along an intersecting ridge portion between the second end surface and the other side surface portion of the two side surface portions and in such a manner that the other side surface portion functions as a rake face, each of the second cutting edges being formed on the intersecting ridge portion between the second end surface and the related side surface portion so as to curve in the direction orthogonal to the axis.

This configuration allows the first cutting edges with the curve shape to be formed on the first end surface side, while allowing the second cutting edges with the curve shape to be formed on the second end surface side. Each of the first cutting edges is formed on the intersecting ridge portion between the first end surface and the side surface portion so as to curve in the direction orthogonal to the axis. Each of the second cutting edges is formed on the intersecting ridge portion between the second end surface and the side surface portion so as to curve in the direction orthogonal to the axis. Thus, the degree of freedom of design of the surface shapes of the first end surface and the second end surface is not substantially limited by the curve shapes of the first cutting edges and the second cutting edges. Consequently, for example, each of the first end surface and the second end surface may be flat. Hence, a bottom wall surface of a corresponding insert mounting seat in which the cutting insert according to the first aspect is mounted need not have a particular curved surface conforming to the shape of the cutting edges.

Preferably, the first cutting edge may be formed so as to have a first predetermined curve shape when the cutting insert is seen from a side opposite to the first end surface, and the second cutting edge may be formed so as to have a second predetermined curve shape when the cutting insert is seen from a side opposite to the second end surface. Preferably, the first cutting edge and second cutting edge associated with each other via a common side surface portion of the two side surface portions may be arranged plane-symmetrically.

Each of the first cutting edge and the second cutting edge may be shaped like a protruding curve shape so as to project outward. Alternatively, each of the first cutting edge and the second cutting edge may be shaped like a recessed curve shape so as to be recessed inward.

Preferably, each of the first cutting edge and the second cutting edge may be formed so as to have an involute curve shape. Alternatively, each of the first cutting edge and the second cutting edge may be formed so as to have a curve shape formed by coupling a plurality of curve portions with different curvatures together. For example, if each of the first cutting edge and the second cutting edge is at least partly formed so as to have a protruding curve shape formed by coupling a first curve portion and a second curve portion together, when the first curve portion has a radius of curvature R1, the second curve portion may have a radius of curvature R2 which is 0.4 R1 or more and is less than 1.0 R1. Alternatively, if each of the first cutting edge and the second cutting edge is at least partly formed so as to have a recessed curve shape formed by coupling a first curve portion and a second curve portion together, when the first curve portion has a radius of curvature R1, the second curve portion may have a radius of curvature R2 which is 1.2 R1 or more and is less than 2.3 R1. The second curve portion may be longer than the first curve portion.

Preferably, a recessed portion may be formed in the peripheral side surface.

More preferably, the cutting insert is detachably mounted in an insert mounting seat in a tool body configured to rotate around an axis of rotation, at a predetermined inclination to a plane defined orthogonally to the axis of rotation, using the first end surface or the second end surface as a seating surface.

A second aspect of the present invention provides a rotary cutting tool including a tool body with two side end surfaces located opposite each other, and a middle plane between the two side end surfaces. The tool body is configured to rotate around an axis of rotation which is orthogonal to the middle plane. The cutting tool includes a first insert mounting seat disposed in the tool body principally on one side of the middle plane and having a first cutting insert as described above mounted therein, and a second insert mounting seat disposed in the tool body principally on the other side of the middle plane and having a second cutting insert as described above mounted therein. The first end surface of the cutting insert functions as an insert seating surface which comes into abutting contact with a bottom wall surface of the first insert mounting seat and the second end surface of the cutting insert functions as an insert seating surface which comes into abutting contact with a bottom wall surface of the second insert mounting seat, and wherein when a plane extending orthogonally to an axis of rotation is defined, the bottom wall surface of the first insert mounting seat is formed at a first predetermined inclination to the plane and the bottom wall surface of the second insert mounting seat is formed at a second predetermined inclination to the plane.

If the cutting insert includes a first cutting edge and a second cutting edge each formed so as to have a curve shape formed by coupling a plurality of curve portions with different curvatures together, a part of each side surface portion of the cutting insert which extends between one curve portion of the first cutting edge and one curve portion of the second cutting edge may function as an abutment surface portion, and a protruding abutted portion which can be brought into abutting contact with the abutment portion may be formed on a side wall surface of the first insert mounting seat and on a side wall surface of the second insert mounting seat.

If a recessed portion is formed in a peripheral side surface of the cutting insert, a projecting portion which can be engaged with the recessed portion of the cutting insert may be formed on the side wall surface of the first insert mounting seat and on the side wall surface of the second insert mounting seat.

Further features of the present invention will become apparent from the following description of exemplary embodiments (with reference to the attached drawings).

DETAILED DESCRIPTION OF THE EMBODIMENTS

Figure 1:
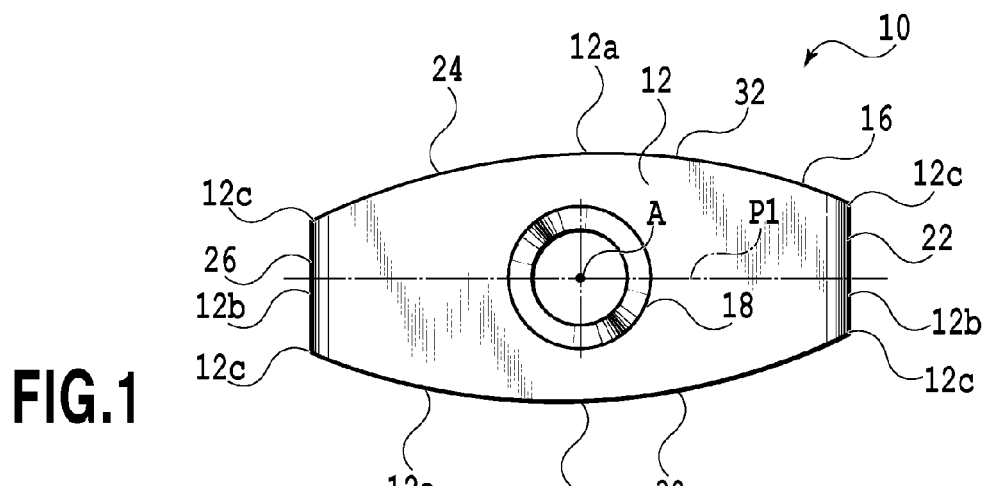
FIG. 1 is a top view of a cutting insert according to a first embodiment of the present invention.

Embodiments of the present invention will be described below in detail with reference to the drawings. In the following description and the figures, the same or similar components are denoted by the same reference numerals throughout the plurality of embodiments and the like. Duplicate description of these components is omitted.

Figure 2:
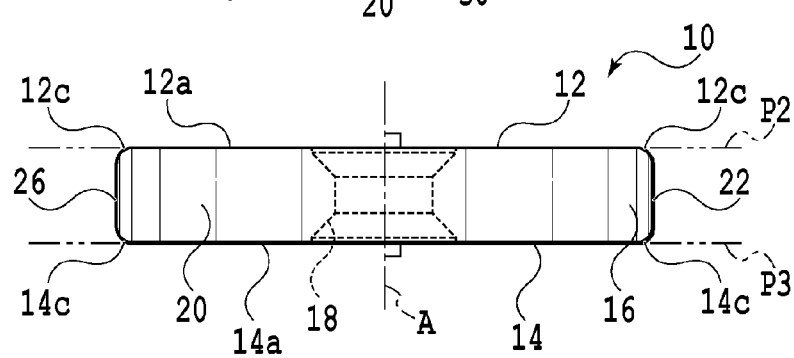
FIG. 2 is a side view of the cutting insert in FIG. 1.
Figure 3:
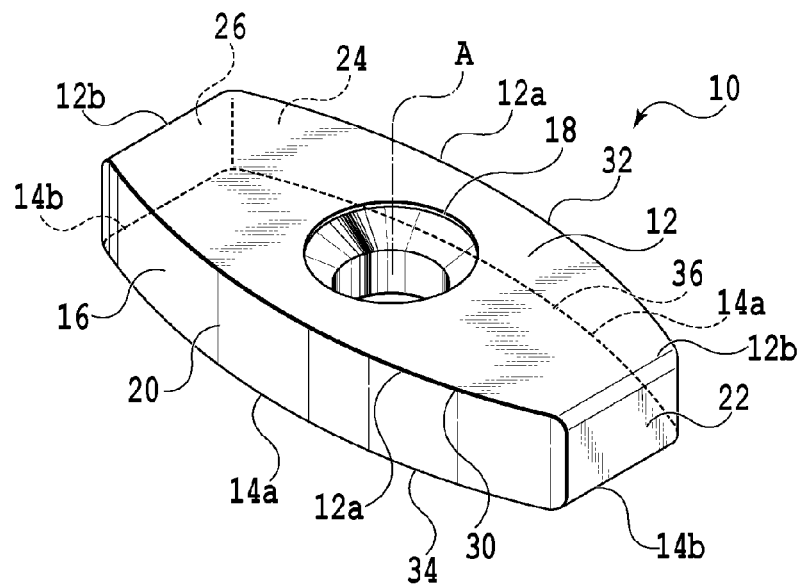
FIG. 3 is a perspective view of the cutting insert in FIG. 1.

As shown in FIG. 1 to FIG. 3, a cutting insert 10 according to a first embodiment of the present invention is shaped substantially like a flat plate. The cutting insert 10 includes two opposite end surfaces 12 and 14, that is, the end surfaces 12 and 14 located opposite each other, and a peripheral side surface 16 extending between the two end surfaces 12 and 14. The cutting insert 10 includes a mounting hole 18 extending between the two end surfaces 12 and 14 to penetrate the end surfaces 12 and 14. The mounting hole 18 includes a central axis A extending so as to penetrate the two end surfaces 12 and 14.

The two end surfaces 12 and 14 located opposite each other consist of the upper surface 12 serving as a first end surface and the lower surface 14 serving as a second end surface. The upper surface 12 and lower surface 14 of the cutting insert 10 according to the first embodiment are formed substantially plane-symmetrically with respect to a plane orthogonal to the central axis A. The upper surface 12 and the lower surface 14 are formed substantially parallel to each other. Furthermore, each of the upper surface 12 and the lower surface 14 is formed rotationally symmetrically around the central axis A. However, the upper surface 12 and lower surface 14 of the cutting insert 10 according to the first embodiment are substantially flat and are each configured to function as an insert seating surface as described below. However, the upper surface and the lower surface may be variously shaped, for example, may be curved or shaped to have recesses and protrusions, particularly in the surface portion thereof except for the edge thereof. The upper surface and the lower surface may be reversed. Either of the upper surface and the lower surface may be referred to as a first end surface or a second end surface. The terms "upper" and "lower" as used herein are used for convenience in order to facilitate the description and not intended to limit the present invention.

The upper surface 12 of the cutting insert 10 according to the first embodiment includes four corner portions 12c and may appear shaped substantially like a rectangle. The upper surface 12 includes a pair of long side portions 12a located opposite each other and serving as a pair of first edges and a pair of short side portions 12b located opposite each other and serving as a pair of second edges. The edges are alternately continuous with one another via corresponding corner portions. The long side portion is longer than the short side portion. Each long side portion 12a is shaped like a protruding curve shape so as to project outward. Each short side portion 12b is formed to extend straight. Thus, the upper surface 12 appears to have the following shape in a plan view, that is, when the cutting insert 10 is seen from a side opposite to the upper surface: the shape obtained by expanding a substantial rectangle as a basis outward. However, the long side portion 12a is formed to substantially extend on a plane defined orthogonally to the central axis A and thus to substantially curve on the plane defined orthogonally to the axis A.

Like the upper surface 12, the lower surface 14 includes four corner portions 14c and may appear shaped substantially like a rectangle. The lower surface 14 includes a pair of long side portions 14a located opposite each other and serving as a pair of first sides and a pair of short side portions 14b located opposite each other and serving as a pair of second sides. The sides are alternately continuous with one another via corresponding corner portions. Each long side portion 14a is shaped like a protruding curve shape so as to project outward. Each short side portion 14b is formed to extend straight. Thus, the lower surface 14 appears to have the following shape in a plan view, that is, when the cutting insert 10 is seen from a side opposite to the lower surface 14: the shape obtained by expanding a substantial rectangle as a basis outward. However, the long side portion 14a is formed to substantially extend on a plane defined orthogonally to the central axis A and thus to substantially curve on the plane defined orthogonally to the axis A.

The lower surface 14 and the upper surface 12 are substantially plane-symmetric with respect to a plane defined orthogonally to the axis A. When a virtual curved surface is defined which extends parallel to the central axis A so as to contain the entire long side portion 12a of the upper surface 12, the upper surface 12 and the lower surface 14 are associated with each other so that the long side portion 14a of the lower surface 14 located on the same side of the cutting insert 10 as that on which the long side portion 12a is located extends on the virtual curved surface Since the upper surface 12 and the lower surface 14 are each shaped substantially like a rectangle as described above, the peripheral side surface 16 includes four side surface portions 20, 22, 24, and 26 which are substantially continuous with one another. Each of the four side surface portions of the cutting insert 10 is formed to mostly extend substantially parallel to the central axis A. The four side surface portions consist of a pair of opposite first side surface portions 20 and 24, that is, the first side surface portions 20 and 24 located opposite each other, and a pair of opposite second side surface portions 22 and 26, that is, the second side surface portions 22 and 26 located opposite each other. Each of the first side surface portions 20 and 24 extends between one of the long side portions 12a of the upper surface 12 and the corresponding long side portion 14a of the lower surface 14. Furthermore, each of the second side surface portions 22 and 26 extends between one of the short side portions 12b of the upper surface 12 and the corresponding short side portion 14b of the lower surface 14. As described above, in the cutting insert 10, the first side surface portions 20, 24 are associated with the long side portion and may thus be referred to as long side surfaces 20, 24. The second side surface portions 22, 26 are associated with the short side portions and may thus be referred to as short side surfaces 22, 26.

In the cutting insert 10, the long side portions are shaped like protruding curve shape so as to project outward, and thus the long side surfaces 20 and 24 are formed as protruding curved surfaces so as to project outward. In particular, the long side portions and the long side surfaces are formed so as to project most outward in the vicinity of the central portion thereof. In other words, the long side portions 12a and 14a and the long side surfaces 20 and 24 are formed as follows: when a plane P1 is defined which extends between the pair of long side portions of the upper surface 12 or the lower surface 14 or the long side surfaces 20 and 24 and which extends so as to contain the central axis A, the long side portions 12a and 14a and the long side surfaces 20 and 24 lie farthest from the plane P1 in the vicinity of the central portion thereof and approach the plane P1 as the distance from the central portion increases.

The long side portions 12a and 14a of the upper surface 12 and the lower surface 14 are each entirely shaped to have an involute curve shape. Upper cutting edges 30 and 32 are each formed on an intersecting ridge portion between the upper surface 12 and the peripheral side surface 16, particularly the corresponding one of the long side surfaces 20 and 24. Similarly, on the lower surface 14 side, lower cutting edges 34 and 36 are each formed on an intersecting ridge portion between the lower surface 14 and the peripheral side surface 16, particularly the corresponding one of the long side surfaces 20 and 24. The upper cutting edges 30 and 32 formed on the intersecting ridge portions between the upper surface 12 and the peripheral side surface 16 may each be referred to as a first cutting edge. The lower cutting edges 34 and 36 formed on the intersecting ridge portions between the lower surface 14 and the peripheral side surface 16 may each be referred to as a second cutting edge. However, these names may be reversed. Here, one of the first cutting edge and the second cutting edge is considered as a right-hand cutting edge, and the other is considered as a left-hand cutting edge. Thus, the first cutting edge and the second cutting edge have substantially the same configuration except that the first cutting edge and the second cutting edge are plane-symmetric.

Thus, the first cutting edges 30 and 32 extend on the intersecting ridge portions between the upper surface 12 and the related long side surfaces 20 and 24 and along a plane P2 defined orthogonally to the axis A. The first cutting edges 30 and 32 are formed to curve in the direction orthogonal to the axis A. In particular, each of the first cutting edges 30 and 32 is formed so as to have a first predetermined curve shape corresponding to an involute curve shape when the cutting insert 10 is seen from a side opposite to the upper surface 12. Similarly, the second cutting edges 34 and 36 extend on the intersecting ridge portions between the lower surface 14 and the corresponding long side surfaces 20 and 24 and along a plane P3 defined orthogonally to the axis A. The second cutting edges 34 and 36 are formed to curve in the direction orthogonal to the axis A. In particular, each of the second cutting edges 34 and 36 is formed so as to have a second predetermined curve shape corresponding to an involute curve shape when the cutting insert 10 is seen from a side opposite to the lower surface 14. According to the present embodiment, the first curve shape and the second curve shape are the same or have a symmetric relation but may be different. When first and second virtual curved surfaces extending parallel to the axis A are defined such that the first cutting edge 30 and 32 extend on the respective first and second virtual curved surfaces, the second cutting edge 34 and 36, associated with the first cutting edge 30 and 32, respectively, via the common long side surface 20 and 24, respectively, substantially extend on the first and second virtual curved surfaces, respectively.

As appreciated from the above description, the cutting insert 10 is configured to be able to transfer the involute curve shape to the workpiece. The use of the cutting insert allows teeth of a gear, particularly an involute gear, to be formed. The cutting insert 10 is configured as described above and thus mounted in an insert mounting seat in a tool body of a cutting tool at a predetermined inclination to a plane defined orthogonally to the axis of rotation of the tool body in order to transfer a particular curve shape such as an involute curve shape to the workpiece, as described below.

As described above, the cutting insert 10 is formed to include two cutting edges for each of the upper and lower surfaces and thus includes a total of four cutting edges. Thus, compared to the cutting insert in Japanese Patent Laid-Open No. 2005-66780, which includes only two cutting edges, the cutting insert 10 will be significantly economically excellent. The two first cutting edges are formed rotationally symmetrically around the central axis A. The two second cutting edges are formed rotationally symmetrically around the central axis A. Consequently, the cutting insert 10 is an indexable cutting insert.

Furthermore, the upper surface 12 and the lower surface 14, which serve as insert seating surfaces, are both flat. The surface shapes of the upper surface 12 and the lower surface 14 (not including the edges thereof) are not limited to the particular curve shape of the cutting edges or to the involute curve shape. Hence, a bottom wall surface of the insert mounting seat in the tool body on which the cutting insert 10 can be mounted need not have an involute curve shape or a shape corresponding to the involute curve shape.

Figure 4:
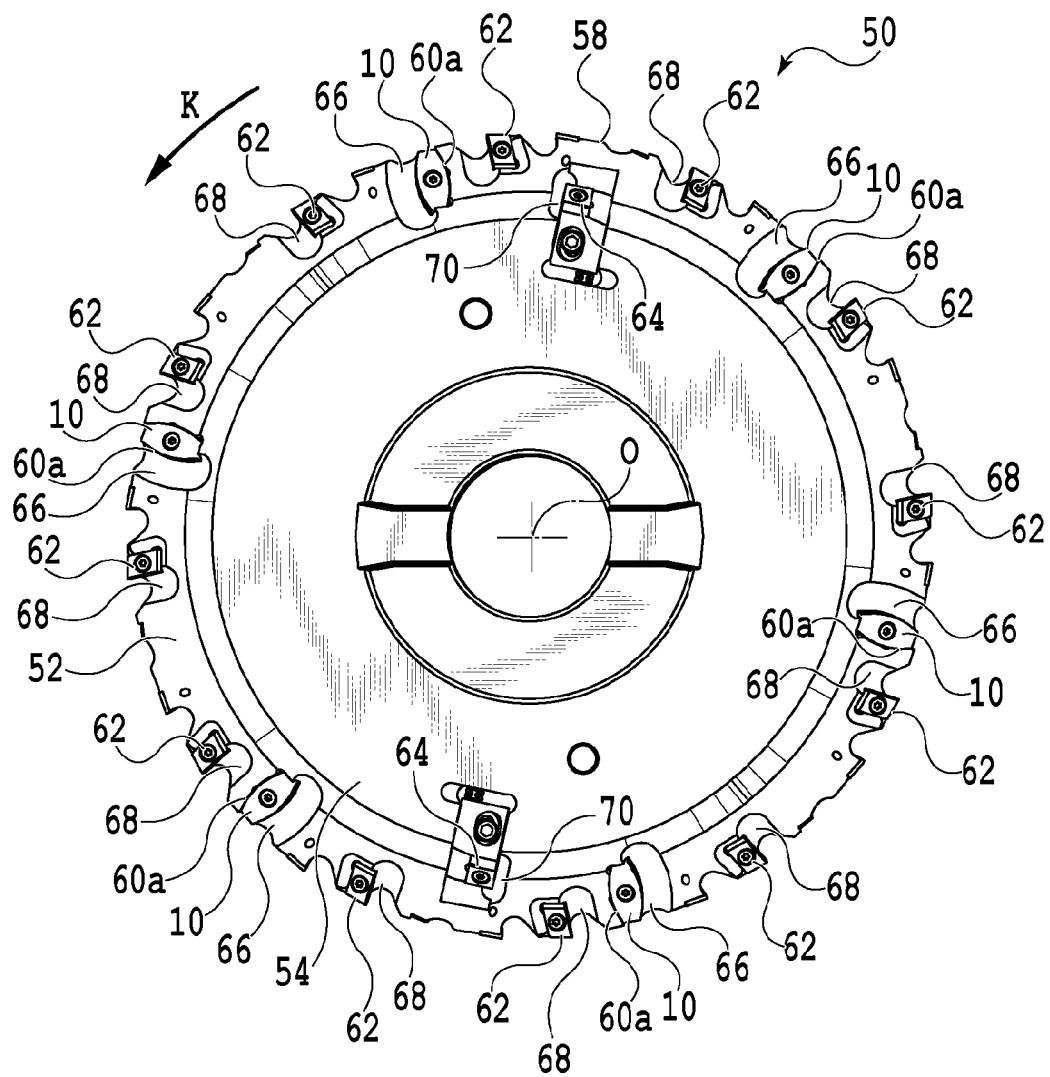
FIG. 4 is a front view of a rotary cutting tool according to the first embodiment of the present invention in which the cutting insert in FIG. 1 is mounted.
Figure 5:
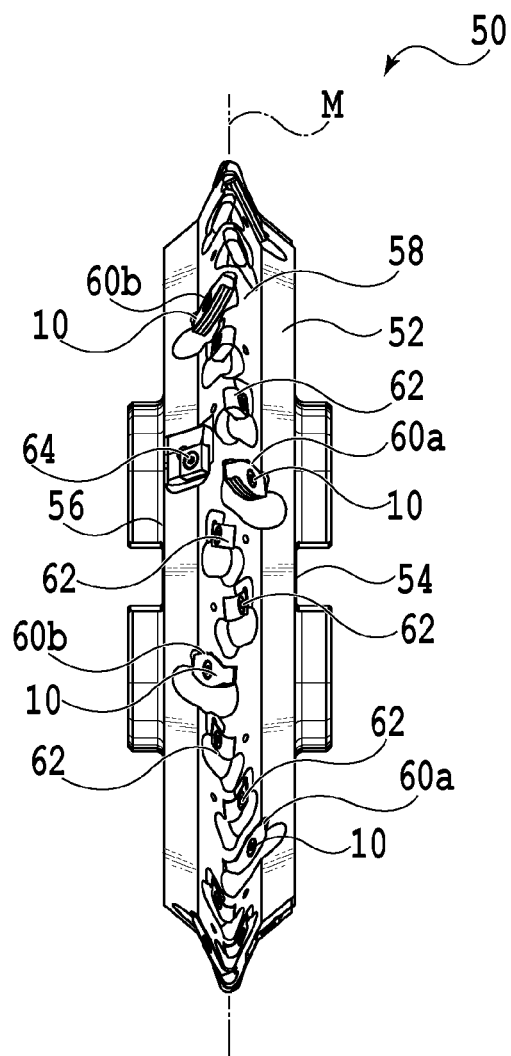
FIG. 5 is a side view of the rotary cutting tool in FIG. 4.

FIG. 4 and FIG. 5 show a cutting tool in which the cutting insert 10 is detachably mounted. An illustrated rotary cutting tool 50 is a gear cutter with a plurality of the cutting inserts 10 mounted therein.

A tool body 52 of the rotary cutting tool 50 has an annular shape basically formed of two substantially disc-shaped side end surfaces 54 and 56 and an outer peripheral surface 58 extending so as to connect the side end surfaces together. An axis of rotation O may be defined at the center of the tool body 52. The tool body 52 of the cutting tool 50 is configured so as to be rotated around the axis of rotation O during use.

Insert mounting seats 60a and 60b in each of which the cutting insert 10 according to the first embodiment is mounted are alternately staggered in the opposite side end surfaces along an outer peripheral edge of the annular tool body 52. The insert mounting seat 60a, one of the insert mounting seats, may hereinafter be referred to as a first insert mounting seat, and in the insert mounting seat 60a, the cutting insert 10 is mounted so as to allow the first cutting edge to be used. The other insert mounting seat 60b may hereinafter be referred to as a second insert mounting seat; the insert mounting seats 60b are disposed on a side end surface side different from a side end surface side on which the first insert mounting seats are disposed. The cutting insert 10 is mounted in the second insert mounting seat 60b so as to allow the second cutting edge to be used.

Furthermore, two types of insert mounting seats are similarly provided in which cutting inserts other than the cutting insert 10 according to the first embodiment, in this case, two types of cutting inserts 62 and 64, are mounted. Moreover, chip pockets 66, 68, and 70 are disposed forward of each of the insert mounting seats in a tool rotating direction K. The cutting insert according to the first embodiment and another cutting insert are longitudinally set in each of the insert mounting seats in the gear cutter 50 in the above-described form using screws.

The rotary cutting tool 50, which is a gear cutter according to the present embodiment, is of a type which carries out gear cutting using a combination of a plurality of types of cutting inserts. This type of gear cutter carries out gear cutting using various types of cutting inserts such as a cutting insert for processing the vicinity of the base end (bottom) of each tooth space, a cutting insert for processing the vicinity of the center of the tooth space, and a cutting insert for processing the vicinity of the top edge of the tooth space. In the cutting tool 50, the cutting insert 10 according to the first embodiment is used to process the vicinity of the center of each tooth (that is, a part of the tooth which is shaped like an involute curve shape).

For example, when the first cutting edge 30, as a cutting edge located on the upper surface 12 side, is used, the cutting insert 10 is mounted in the insert mounting seat 60a so that the lower surface 14 of the cutting insert 10 comes into abutting contact with the bottom wall surface of the first insert mounting seat 60a and that the long side surface 24 and short side surface 22, included in the peripheral side surface of the cutting insert 10 and not associated with the aforesaid cutting edge, come into abutting contact with corresponding side wall surfaces of the insert mounting seat. At this time, the upper surface 12 and the short side surface 26, positioned on an outer peripheral side, function as a flank. The long side surface 20, which includes the first cutting edge 30 along the intersecting ridge portion between the long side surface 20 and the upper surface 12, functions as a rake face.

On the other hand, for example, when the second cutting edge 34, as a cutting edge located on the lower surface 14 side, is used, the cutting insert 10 is mounted in the insert mounting seat 60b so that the upper surface 12 of the cutting insert 10 comes into abutting contact with the bottom wall surface of the insert mounting seat 60b and that the long side surface 24 and short side surface 22, included in the peripheral side surface of the cutting insert 10 and located away from the aforesaid cutting edge, come into abutting contact with corresponding side wall surfaces of the insert mounting seat 60a. At this time, the lower surface 14 and the short side surface 26, positioned on an outer peripheral side, function as a flank. The long side surface 20, which includes the second cutting edge 34 along the intersecting ridge portion between the long side surface 20 and the lower surface 14, functions as a rake face.

The bottom wall surfaces of the insert mounting seats 60a and 60b, in which the cutting inserts 10 are mounted, are formed at a predetermined inclination. This will be described below with reference to FIG. 6. However, only one of these insert mounting seats, the insert mounting seat 60a, will be described below, because the two insert mounting seats 60a and 60b have substantially the same configuration except that the insert mounting seats 60a and 60b are plane-symmetrically configured.

Figure 6:
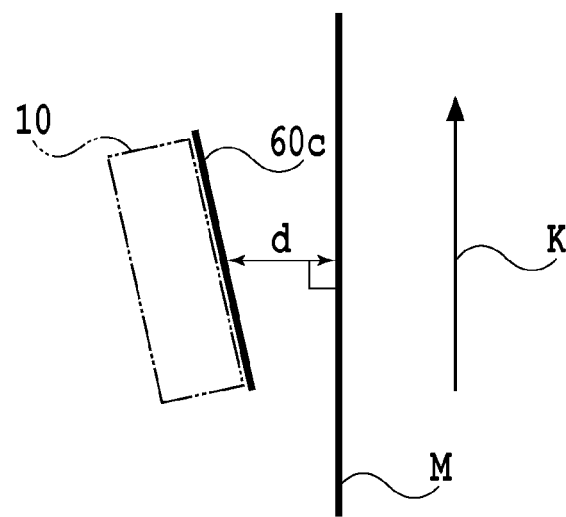
FIG. 6 is a schematic diagram of a certain insert mounting seat in the rotary cutting tool in FIG. 5, showing the inclination of a bottom wall surface of the insert mounting seat in a simplified manner.

A bottom wall surface 60c of the insert mounting seat 60a is inclined with respect to a tool rotating direction K. That is, the bottom wall surface 60c is formed such that as a part of the bottom wall surface 60c of one insert mounting seat 60a is located at a more forward position in the tool rotating direction K, the part of the bottom wall surface 60c is located more outward. In short, when a plane extending orthogonally to the axis of rotation O is defined, the bottom wall surface 60c is formed at a predetermined inclination to the plane. FIG. 5 illustrates a middle plane M of the tool body, with each of the insert mounting seats 60a, 60b being disposed principally on one side or the other of the middle plane M. The middle plane M is defined to extend orthogonally to the axis of rotation O and at a substantially equal distance from the opposite side end surfaces 54 and 56, as a plane extending orthogonally to the axis of rotation O. For example, in an assumed cross section of the insert mounting seat 60a in which the cutting insert 10 is mounted, as schematically shown in FIG. 6, the bottom wall surface 60c of the first insert mounting seat 60a is formed so as to incline so that a distance d between the bottom wall surface 60c and the middle plane M in the direction of the axis of rotation O increases in the tool rotating direction K. FIG. 6 schematically illustrates the relation between the bottom wall surface 60c of one first insert mounting seat 60a and the middle plane M with respect to the tool rotating direction K. The bottom wall surface 60c of the second insert mounting seat 60b has, to the middle plane M, an inclination (second predetermined inclination) opposite to the inclination of the bottom wall surface 60c of the first insert mounting seat 60a to the middle plane M (first predetermined inclination).

Figure 7:
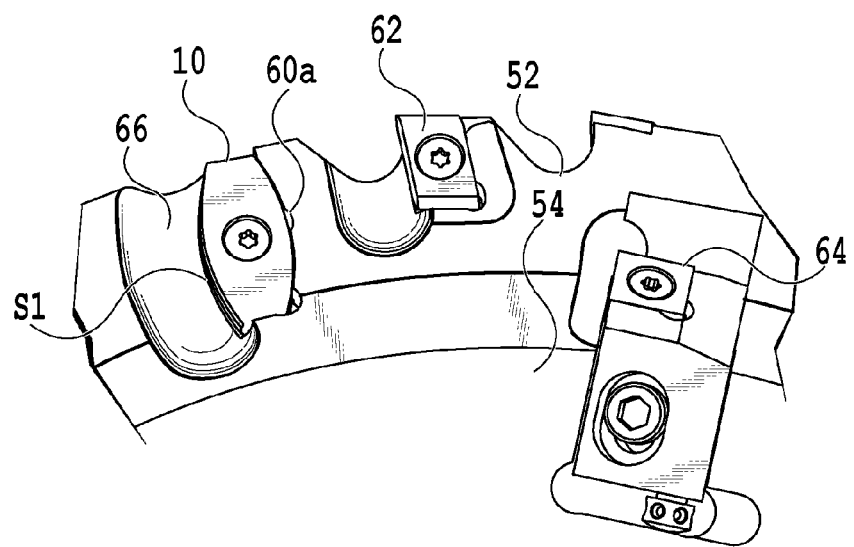
FIG. 7 is a partly enlarged view of the rotary cutting tool in FIG. 4.

Thus, when for example, the cutting insert 10 is mounted in the insert mounting seat 60a using the lower surface 14 as a seating surface, the cutting insert is arranged so as to incline so that the long side surface which has the first cutting edge 30 or 32 with the involute curve shape formed along the edge thereof and which is located in the front side of the tool rotating direction K (that is, the long side surface adjacent to the chip pocket 66) rises obliquely from the side end surface of the tool body 52. As also seen in FIG. 7 which is a partly enlarged view of the cutting tool 50, when the cutting insert 10 is seen from a side opposite to the side end surface 54 of the tool body 50, it is understood that the cutting insert 10 is arranged so as to incline to the degree that a side surface portion S1 of the long side surface which is adjacent to or faces the chip pocket 66 in the cutting insert 10 is visible. The cutting inserts are positioned in the tool body in such an arrangement as described above, and thus the involute curve can be reliably transferred to the workpiece.

Such an inclination or inclination angle of the bottom wall surface 60c to a plane such as the middle plane M which is defined orthogonally to the axis of rotation O is set according to the shape of the cutting edges intended to be formed into the workpiece. To prevent possible excessive cutting resistance, the inclination of the bottom wall surface 60c to the plane is determined so as to set the rake angle within a certain range.

According to the first embodiment, the cutting insert is configured, as shown in FIG. 1 to FIG. 3, such that the side surface portions 20 and 24 connecting the long side portions of the upper surface 12 and lower surface 14 of the cutting insert 10 extend substantially perpendicular to the upper surface 12 and the lower surface 14. However, the side surface portions 20 and 24 are not limited to this shape. The side surface portions 20 and 24 may be recessed inward of the cutting insert 10 or conversely project outward.

Figure 8:
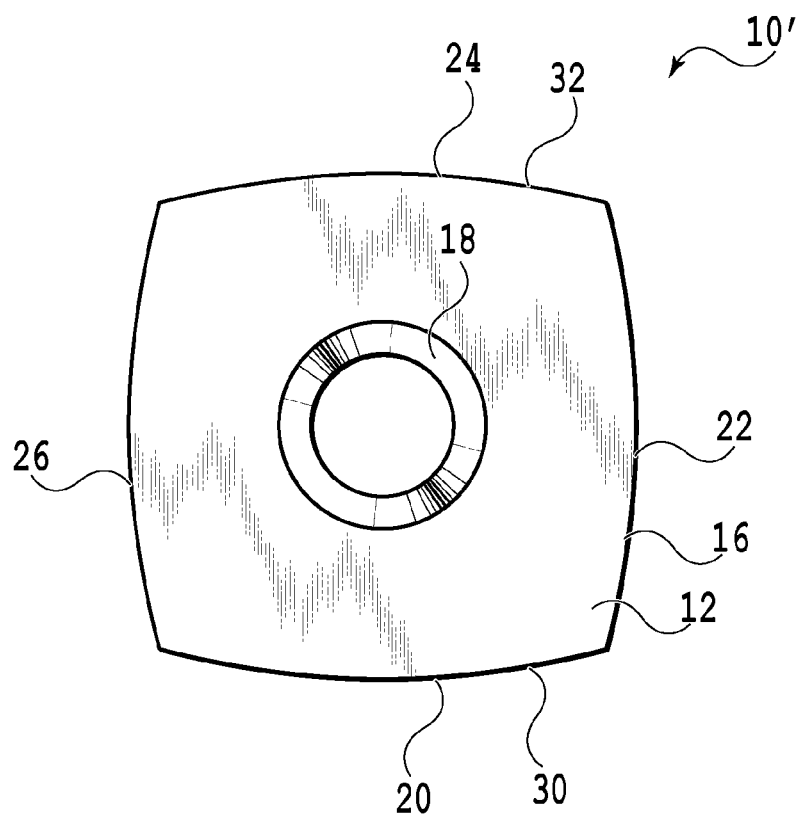
FIG. 8 is a top view of a cutting insert according to a second embodiment of the present invention.

In the cutting insert according to the first embodiment, the cutting insert 10 has a contour which appears basically shaped substantially like a rectangle in a plan view and long side portions with an involute curve shape. However, sides or edges with a curve shape or a curved shape are not limited to this configuration. That is, the present invention allows such a curve shape to be formed on the short side portion. The length ratio of the long side portion to the short side portion at the same end surface may be varied as appropriate. Thus, the cutting insert may have a contour which appears shaped substantially like a square in a plan view. In this case, distinct types of sides, long and short sides, need not be provided, and a set of opposite sides can be shaped like a set of curves. More specifically, a basic element of the present invention is that sides shaped like curves are one set of opposite sides or sides located opposite each other. The other set of opposite sides or sides located opposite each other may also be shaped like curves. That is, all the sides of a cutting insert which appears substantially like a rectangle in a plan view may be shaped like curves. FIG. 8 illustrates a cutting insert 10' according to a second embodiment, an example of a cutting insert in the above-described form.

The cutting insert 10' in FIG. 8 is formed to have a contour which appears shaped substantially like a square in a plan view. All the edges of the cutting insert 10' which appears shaped substantially like a tetragon in a plan view are shaped like curves. The present invention does not exclude a configuration in which all the sides of the upper surface or the lower surface function as cutting edges.

Furthermore, according to the first embodiment, the cutting insert 10 is mounted in the insert mounting seat in the tool body 52 so as to bring the relevant surfaces of the cutting insert 10 into firm abutting contact with corresponding surfaces of the insert mounting seat. However, one or both of the cutting insert and the tool body may include at least one engagement portion. A third embodiment according to the present invention including such an engagement portion will be described.

A cutting insert 110 and a cutting tool 150 according to the third embodiment will be described based on FIG. 9 to FIG. 11. However, differences between the third embodiment and the first embodiment will be described below, with the description of common matters omitted.

Figure 9:
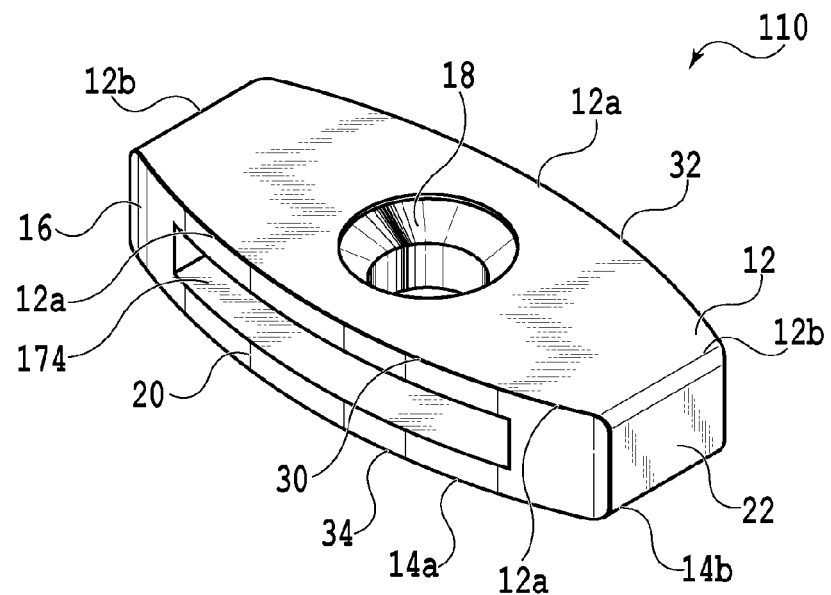
FIG. 9 is a perspective view of a cutting insert according to a third embodiment of the present invention.
Figure 10:
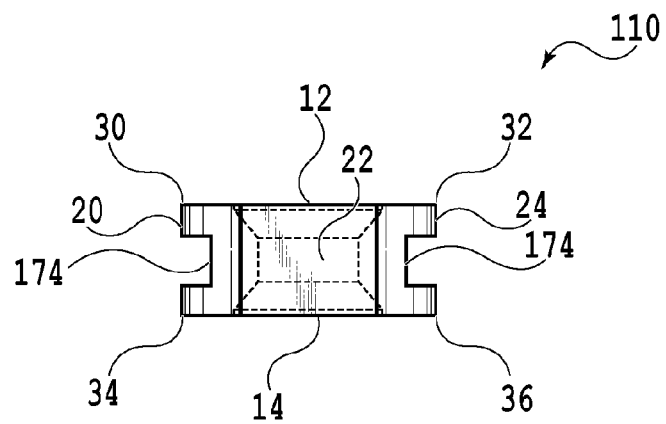
FIG. 10 is a side view of the cutting insert in FIG. 9.

FIG. 9 and FIG. 10 show the cutting insert 110. In addition to the components of the cutting insert 10, the cutting insert 110 further includes a recessed portion 174 sunken inward in the long side surfaces 20 and 24 of the peripheral side surface 16. The recessed portion 174 functions as an engagement portion or a restricting portion when the cutting insert 110 is seated in the insert mounting seat 60a or 60b of the tool body 52.

Figure 11:
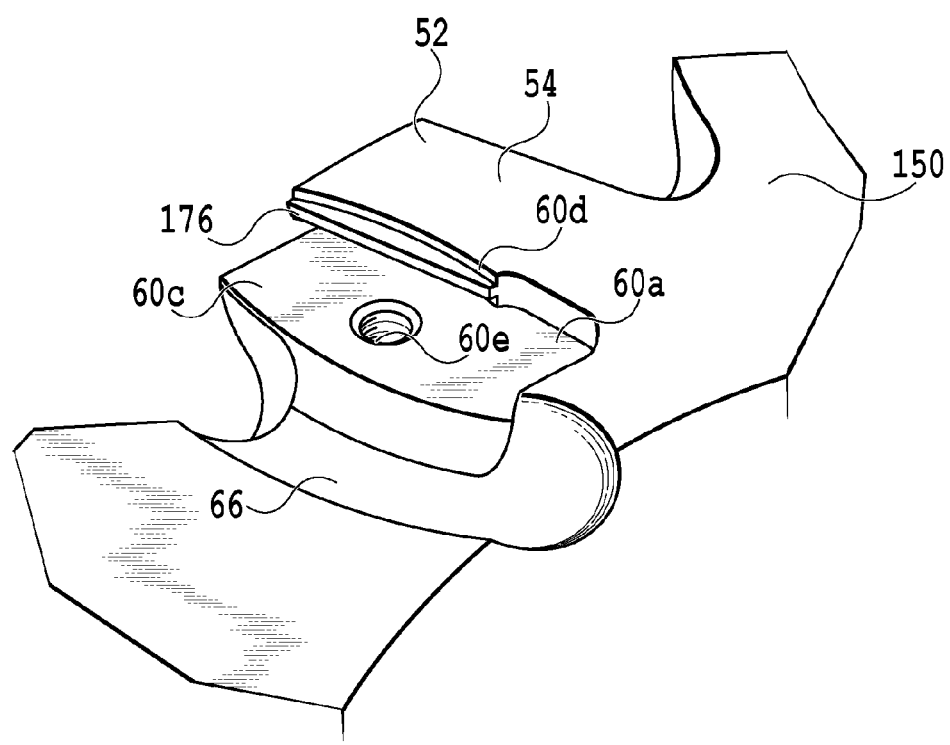
FIG. 11 is a partly enlarged view of an insert mounting seat in a tool body of the rotary cutting tool according to the third embodiment of the present invention and in which the cutting insert in FIG. 9 is mounted.

As shown in FIG. 11, a projecting portion 176 which can engage with the recessed portion 174 is provided on a side wall surface 60d of the insert mounting seat 60a in the tool body 52 of the cutting tool 150. The side wall surface 60d is substantially perpendicular to the bottom wall surface 60c with a threaded hole 60e in the insert mounting seat 60a. Here, the projecting portion 176 extending from the side wall surface 60d projects substantially parallel to the bottom wall surface 60c.

When the cutting insert 110 is mounted, the recessed portion 174 of the cutting insert 110 is fitted over the projecting portion 176 on the insert mounting seat 60a or 60b of the tool body 52. This engagement structure or fitting structure allows the cutting insert 110 to be more strongly fixed to the tool body 52. Thus, in contrast to the first embodiment, the shape of the side surface portion of the cutting insert need not necessarily substantially conform to the shape of the side wall surface of the insert mounting seat. The relation between the cutting insert 110 and the insert mounting seat in the tool body 52 of the cutting tool 150 allows the shape of the cutting edges to vary to some degree. Consequently, the adoption of such an engagement structure enables different types of cutting inserts for forming differently shaped teeth to be mounted in a common tool body.

The recessed portion 174 formed in the cutting insert may be varied in position and shape as appropriate. For example, the recessed portion may be shaped with the rake face shape of the cutting insert taken into account. Preferably, the recessed portion may be formed in the peripheral side surface of the cutting insert so as to facilitate formation of a substantially positive rake angle.

Furthermore, in the cutting inserts 10, 10', and 110, although not shown in the drawings, a chip breaker may be formed in the side surface portions 20 and 24, serving as a rake face, for example, in order to allow chips to be more appropriately disposed of. The shape of the chip breaker may be determined as appropriate with elements such as the type of the workpiece to be cut and the type of the material of the cutting insert taken into account. Additionally, in order to improve the strength of the cutting edge, honing or land may be formed on the cutting edge or the intersecting ridge portion on which the cutting edge is formed. The shape of the honing or the land may be determined as appropriate with elements such as the type of the workpiece to be cut and the type of the material of the cutting insert taken into account.

The cutting inserts 10, 10', and 110 may be produced using a hard material such as cemented carbide, coated cemented carbide, cermet, ceramic or an ultra high pressure sintered compact containing diamond or cubic boron nitride. This also applies to cutting inserts described below. The cutting inserts according to the present invention are not limited to the production using these materials. Various materials may be used to produce the cutting inserts.

In the cutting inserts 10, 10', and 110 according to the first to third embodiments, the cutting edge is formed to substantially extend only on the intersecting ridge portion between the related end surface and the related side surface portion of the peripheral side surface. However, the present invention allows for another aspect of the cutting edge formed to extend along the intersecting ridge portion between the related end surface and the related side surface portion of the peripheral side surface. In other words, the present invention allows for various cutting edges formed such that at least a part of the cutting edge extends along the intersecting ridge portion between the related end surface and the related side surface portion.

Now, a fourth embodiment according to the present invention will be described. Mainly differences between the fourth embodiment and all of the first to third embodiments will be described. Descriptions of matters common to the first to fourth embodiments are omitted unless necessary. The fourth embodiment described below also allows for variations similar to the variations of the first embodiment or the like within the range which is not contradictory. The fourth embodiment can exert effects similar to the effects of the first embodiment or the like.

Figure 12:
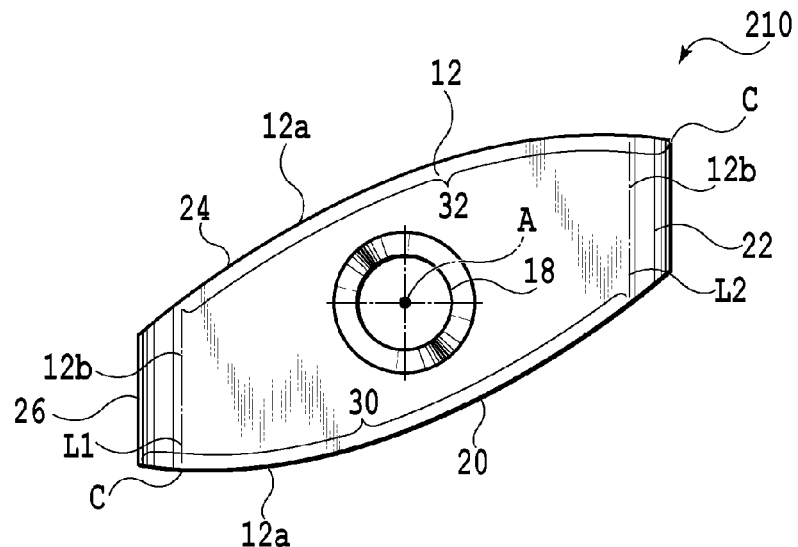
FIG. 12 is a top view of a cutting insert according to a fourth embodiment of the present invention.
Figure 13:
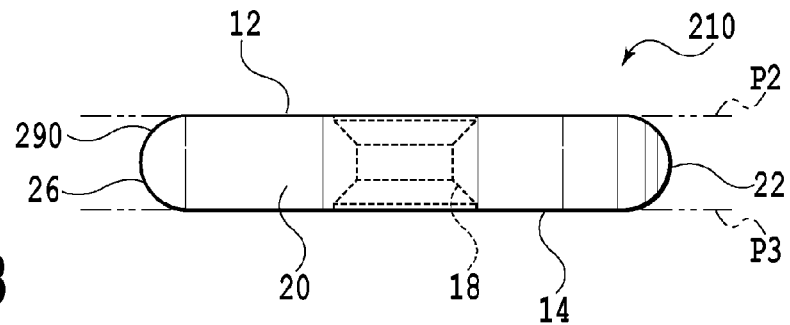
FIG. 13 is a side view of the cutting insert in FIG. 12.
Figure 14:
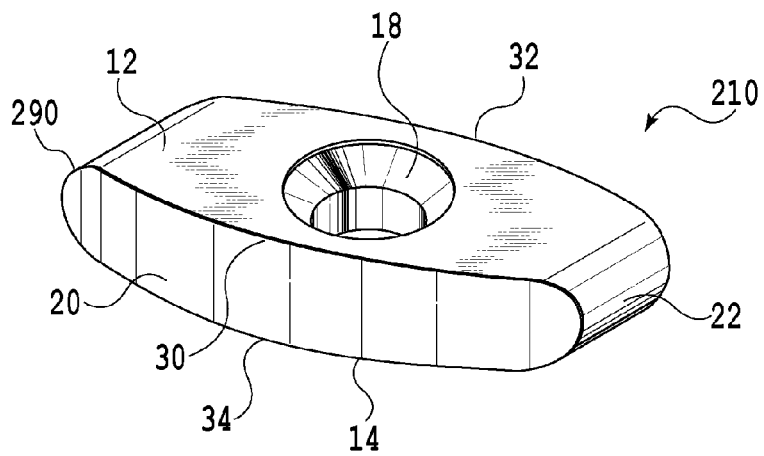
FIG. 14 is a perspective view of the cutting insert in FIG. 12.

As shown in FIG. 12 to FIG. 14, the upper surface 12 and lower surface 14 in a cutting insert 210 according to the fourth embodiment basically appear shaped substantially like a parallelogram in a plan view. As is the case with the cutting insert 10, each of the long side portions of each of the upper and lower surfaces is shaped like an involute curve shape. According to the present embodiment, the short side surfaces 22 and 26 each connecting the short side portions of the upper surface 12 and the lower surface 14 appear, as is apparent from FIG. 13, shaped like curved surfaces projecting outward of the cutting insert 210 in a protruding form when the cutting insert 210 is seen from the long side surface 20 and 24 side. Thus, the upper surface connects smoothly to the short side surface and the lower surface connects smoothly to the short side surface. FIG. 12 shows the boundaries between the upper surface and the short side surfaces as dotted lines L1 and L2, to facilitate understanding of them.

The first cutting edges 30 and 32 of the cutting insert 210 according to the fourth embodiment are also formed to extend along a plane P2 defined orthogonally to the axis A and on the intersecting ridge portions between the upper surface 12 and the long side surfaces 20 and 24, respectively, and to curve in the direction orthogonal to the axis A. In particular, each of the first cutting edges 30 and 32 is formed so as to have a predetermined first curve shape corresponding to an involute curve when the cutting insert 210 is seen from a side opposite to the upper surface 12. Similarly, the second cutting edges 34 and 36 are also formed to extend along a plane P3 defined orthogonally to the axis A and on the intersecting ridge portions between the lower surface 14 and the long side surfaces 20 and 24, respectively, and to curve in the direction orthogonal to the axis A. In particular, each of the second cutting edges 34 and 36 is formed so as to have a predetermined second curve shape corresponding to an involute curve when the cutting insert 210 is seen from a side opposite to the lower surface 14. According to the present embodiment, the first curve shape and the second curve shape are the same or have a symmetric relation but may be different. When a virtual curved surface extending parallel to the axis A is defined such that the first cutting edge 30 and 32 extends on the virtual plane, the second cutting edge 34 and 36, associated with the first cutting edge 30 and 32 via the common long side surface 20 and 24, substantially extends on the virtual curved surface.

The cutting insert 210 allows the following cutting edge to be used to form tooth bottoms in a gear or the like by cutting: a cutting edge formed on an intersecting ridge portion located near a corner portion (acute-angled corner portion) C at which the long side surface and the short side surface form an acute angle or a right angle in a plan view. Thus, among the intersecting ridge portions between the long side surfaces 20 and 24 and the short side surfaces 22 and 26, the intersecting ridge portions located adjacent to the acute-angled corner portions function as cutting edges.

Not only in the present embodiment but also in the first embodiment, the short side surface may be shaped like a protrusion. According to the fourth embodiment, the angle of the acute-angled corner portion or the angle of an obtuse-angled corner portion may be set as appropriate with the type of the workpiece, cutting conditions, and the like taken into account.

Figure 15:
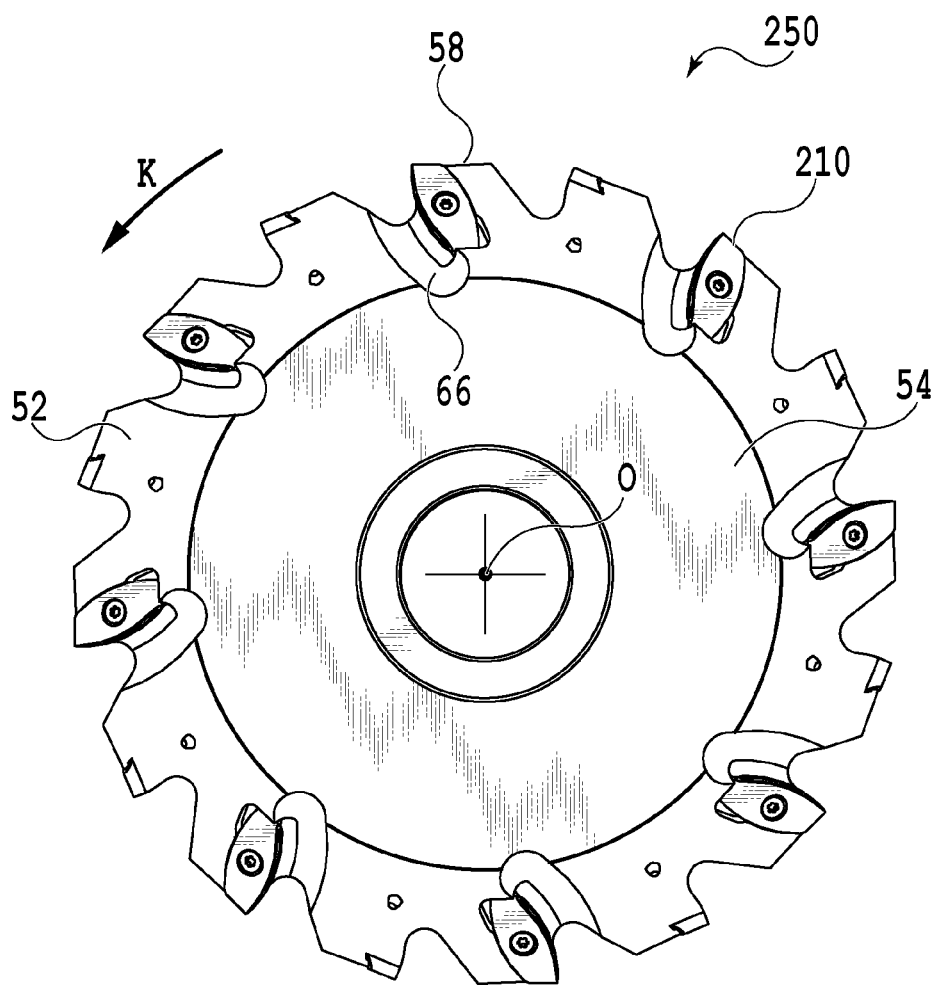
FIG. 15 is a front view of a rotary cutting tool according to the fourth embodiment of the present invention in which the cutting insert in FIG. 12 is mounted.
Figure 16:
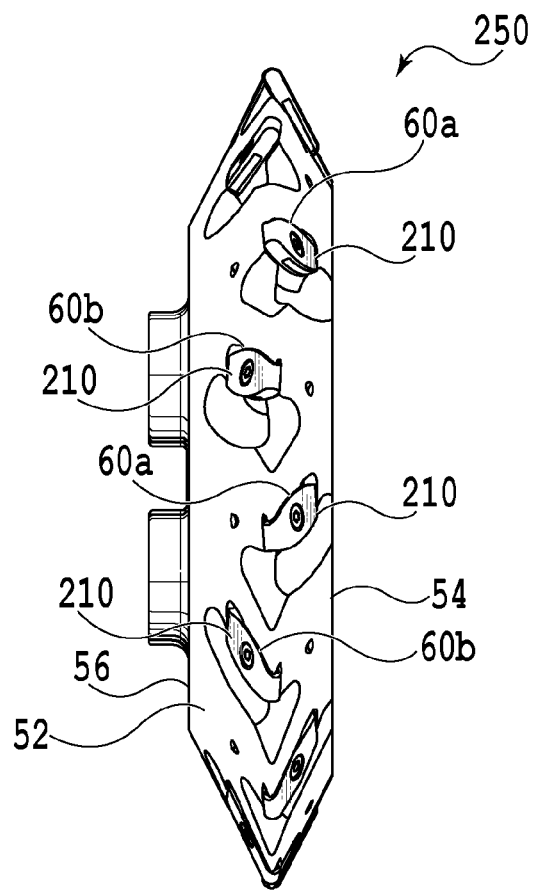
FIG. 16 is a side view of the rotary cutting tool in FIG. 15.

FIG. 15 and FIG. 16 show a rotary cutting tool 250 with the cutting insert 210 according to the fourth embodiment mounted therein. The rotary cutting tool 250 is a gear cutter. Unlike the above-described cutting tool 50, the cutting tool 250 according to the present embodiment is of a type in which only the cutting inserts 210 according to the fourth embodiment are mounted in the tool body 52. That is, the cutting tool 250 is of a type which allows the entire tooth to be processed only by the cutting edges formed on the cutting insert 210. Like the cutting insert 10, the cutting insert 210 is mounted in the insert mounting seat in the tool body 52 at a predetermined inclination.

In the cutting tool 250 according to the present embodiment, the cutting insert 210 is mounted in the tool body 52 so that the cutting edge located near the acute-angled corner portion in a plan view of the cutting insert is involved in cutting. That is, for example, the cutting insert 210 is configured as follows. When the cutting insert 210 is detachably mounted in the tool body 52 using the upper surface 12 as a flank and the lower surface 14 as a seating surface, on the outer peripheral surface side of the tool body 52, the obtuse-angled corner portion of the cutting insert 210 comes into contact with the side wall surface of the insert mounting seat and the acute-angled corner portion is positioned in an open space closer to the chip pocket.

On the upper surface 12 side of the cutting insert 210, the first cutting edges 30 and 32, formed to extend along the intersecting ridge portions between the upper surface and the respective long side surfaces, are formed not only to partly extend on the intersecting ridge portions between the upper surface and the long side surfaces but also to extend to the intersecting ridge portion between the long side surface and the short side surface. That is, on the upper surface side, the intersecting ridge portion between the upper surface 12 and the long side surface 20 and the intersecting ridge portion between the long side surface 20 and the short side surface 26 function as the continuous cutting edge 30, and the intersecting ridge portion between the upper surface 12 and the long side surface 24 and the intersecting ridge portion between the long side surface 24 and the short side surface 22 function as the continuous cutting edge 32. The cutting insert 210 is configured as follows in order to allow the cutting tool 250 according to the present embodiment to also cut the vicinity of the base end (bottom) of the tooth using one type of the cutting insert 210. That is, unlike the cutting insert 10 according to the first embodiment, the cutting insert 210 also allows the intersecting ridge portion between the long side surface 20 and the short side surface 26 and the intersecting ridge portion between the long side surface 24 and the short side surface 22 to function as cutting edges involved in cutting. On the lower surface 14 side, the second cutting edges 34 and 36 are also formed with the same cutting edge configuration. This enables a total of four cutting edges, two cutting edges on the upper surface side and two cutting edges on the lower surface side, to be used to transfer the involute curve shape to the workpiece. In the cutting insert 210 according to the fourth embodiment, the cutting edge extending to the intersecting ridge portion between the long side surface and the short side surface in a plan view has an involute curve shape.

The cutting insert according to the fourth embodiment carries out cutting using the cutting edge located adjacent to the acute-angled corner portion. Thus, compared to the cutting insert according to the first embodiment, the cutting insert according to the fourth embodiment allows for an easy increase in the rake angle of the cutting insert set when mounted in the tool body, and further enables the tool angle to be reduced. This in turn allows for a significant reduction in cutting resistance, enabling the cutting edges to cut cleanly and to be inhibited from being damaged. Therefore, the cutting insert according to the fourth embodiment is particularly suitable for a gear cutter which uses only one type of cutting insert and thus undergoes stronger cutting resistance per cutting insert.

Figure 17:
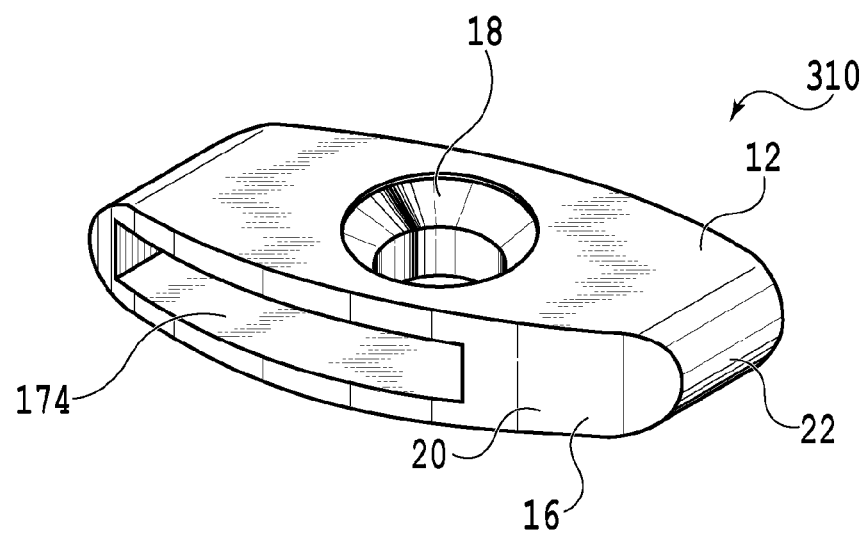
FIG. 17 is a perspective view of a cutting insert according to a fifth embodiment of the present invention.

The fourth embodiment has been described. However, like the cutting insert 110, the cutting insert according to the fourth embodiment may further include the recessed portion 174. FIG. 17 shows a cutting insert 310 according to a fifth embodiment which includes not only the components of the cutting insert 210 but also the recessed portion 174. Even in the cutting insert 310, the recessed portion may be optionally varied in shape and position. The recessed portion is configured such that the projecting portion of the corresponding insert mounting seat is fitted in the recessed portion as described above. This allows the cutting insert 310 to be firmly fixed in the tool body.

Figure 18:
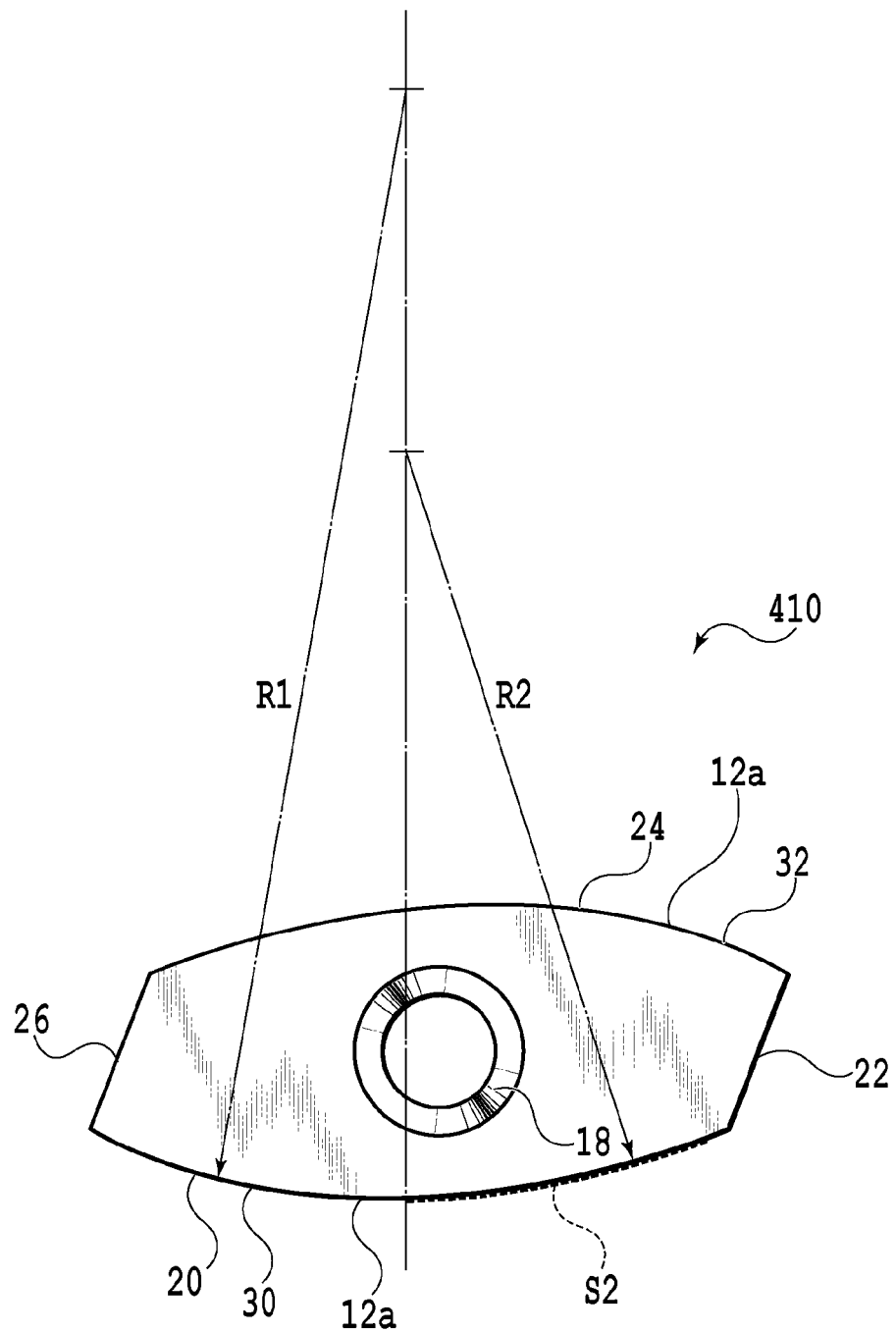
FIG. 18 is a top view of a cutting insert according to a sixth embodiment of the present invention.

In the above-described cutting inserts 10, 10', 110, 210, and 310 according to the first to fifth embodiments and the like, the curve shape of the cutting edge is shaped like an involute curve shape. However, the curve shape of the cutting edges may be formed by coupling two types of curve portions with the respective types of curvatures together. This configuration has further practical advantages. FIG. 18 shows a cutting insert 410 according to a sixth embodiment as an example of a cutting insert with such a curved cutting edge as formed by coupling two types of curve portions together.

In the cutting insert 410 in FIG. 18, the long side portions of the upper surface and the lower surface, that is, the cutting edges are configured to vary in curvature in the middle thereof. The following benefits can be obtained by forming a curved cutting edge using two curve portions with different curvatures.

According to the first to fifth embodiments, when the cutting insert is mounted in the tool body, the side wall surface of the insert mounting seat in the tool body comes into abutting contact with the long side surface of the cutting insert. Thus, the side wall surface of the insert mounting seat generally needs to be shaped like an involute curve conforming to the shape (that is, the involute curve) of the curved cutting edge of the cutting insert. However, the involute curve is complicated and gradually varies in curvature, and thus precisely processing the side wall surface of the insert mounting seat into the involute curve shape is not easy. As a result, the state of the contact between the side surface portion of the cutting insert and the side wall surface of the insert mounting seat may vary. That is, possible unconformity between the involute curve shape of the side surface portion of the cutting insert and the involute curve shape of the side wall surface of the insert mounting seat may limit the improvement in seating and supporting the cutting insert. In contrast, not only the side surface portion of cutting insert but also the side wall surface of the insert mounting seat can be easily formed by approximating the involute curve as a curve with two curvatures to simplify the involute curve. This allows the side surface shape of the cutting insert to be more precisely fitted to the shape of the side wall surface of the insert mounting seat. Consequently, the cutting insert can be more appropriately fixed.

As shown in FIG. 18, when one curve portion of the two curve portions of one cutting edge (first curve portion) is assumed to have a first radius of curvature R1, the other curve portion (second curve portion) preferably has a second radius of curvature R2 which is 0.4 R1 or more and is less than 1.0 R1. This is because when the ratio of the radii of curvature of the two curve portions falls out of this range, the degree of approximation of the involute curve decreases, thus reducing processing precision. That is, this range is the desirable numerical range which enables the cutting insert to be appropriately fixed, while simultaneously allowing processing precision to be increased by approximation of the involute curve. In the cutting insert 410, the first curve portion having first radius of curvature R1 is positioned closer to the tip of the cutting edge than the second curve portion having second radius of curvature R2. In other words, when the cutting insert 410 is mounted in the tool body of the rotary cutting tool, the first curve portion of the operative cutting edge is positioned peripherally outward of the second curve portion of the same cutting edge.

Such an approximate involute curve is not limited to the curve formed of two curve portions but may be formed of three or more curve portions with different curvatures. However, with manufacturing errors taken into account, the approximate involute curve may be most preferably formed of two curve portions. When the approximate involute curve is formed of three or more curve portions, the area of the contact between the side wall surface of the insert mounting seat and the side surface of the cutting insert is preferably reduced in order to decrease the possibility of problems as mentioned above. For example, preferably, a part of the side wall surface of the insert mounting seat is formed to be recessed (see FIG. 11), and thereby the side wall surface of the insert mounting seat is configured so as to contact only a part of the side surface portion of the cutting insert. Of course, this configuration may be adopted even if the approximate involute curve is formed of two curves.

Figure 19:
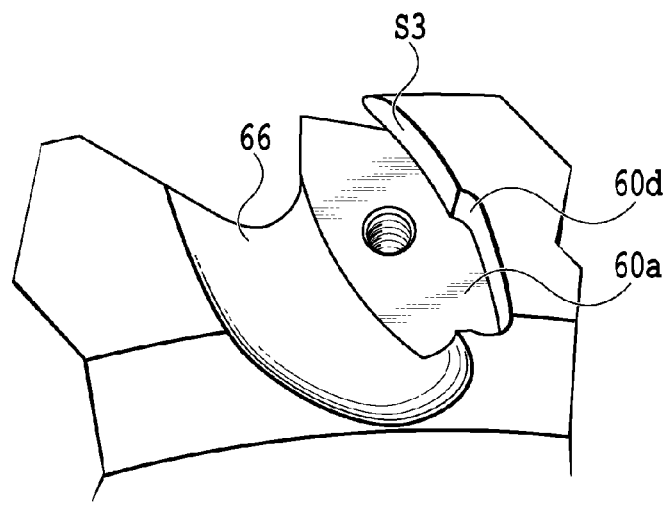
FIG. 19 is a partly enlarged view of an insert mounting seat in a tool body of the cutting tool according to the sixth embodiment of the present invention and in which the cutting insert in FIG. 18 is mounted.
Figure 20:
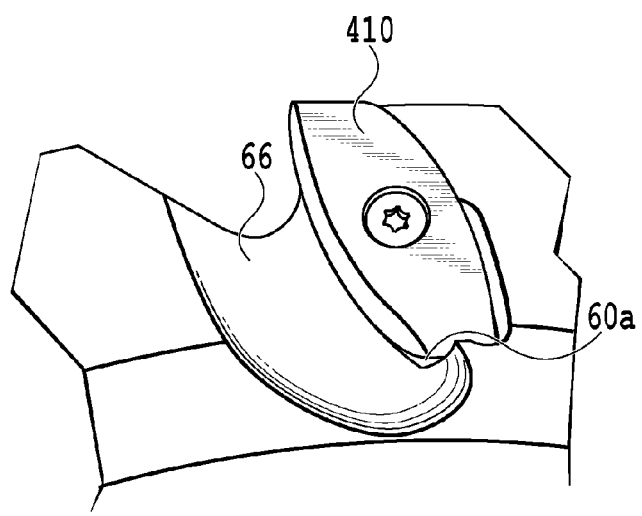
FIG. 20 is a diagram illustrating that the cutting insert in FIG. 18 is mounted in the insert mounting seat in FIG. 19.
Figure 21:
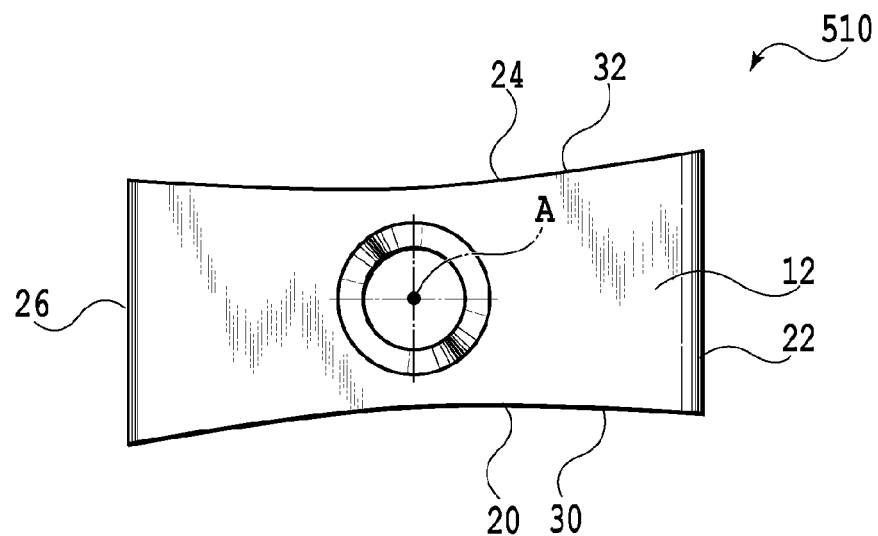
FIG. 21 is a top view of a cutting insert according to a seventh embodiment of the present invention.
Figure 22:
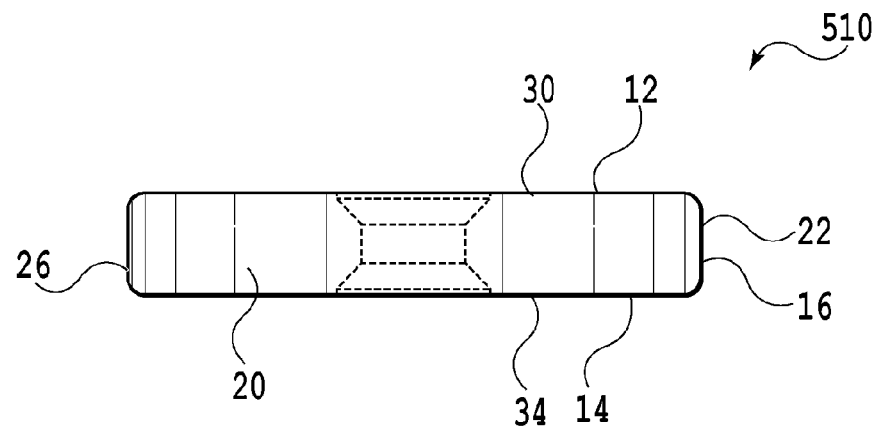
FIG. 22 is a side view of the cutting insert in FIG. 21.
Figure 23:
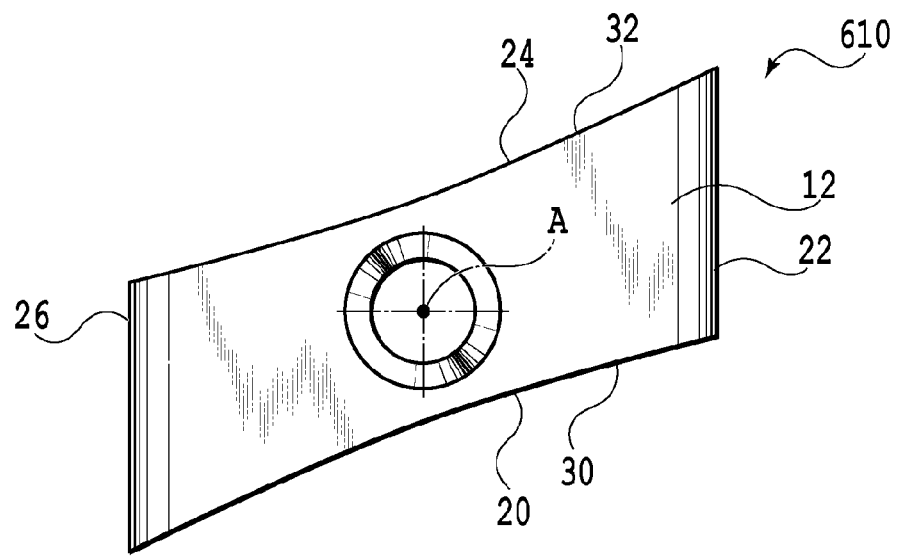
FIG. 23 is a top view of a cutting insert according to an eighth embodiment of the present invention.
Figure 24:
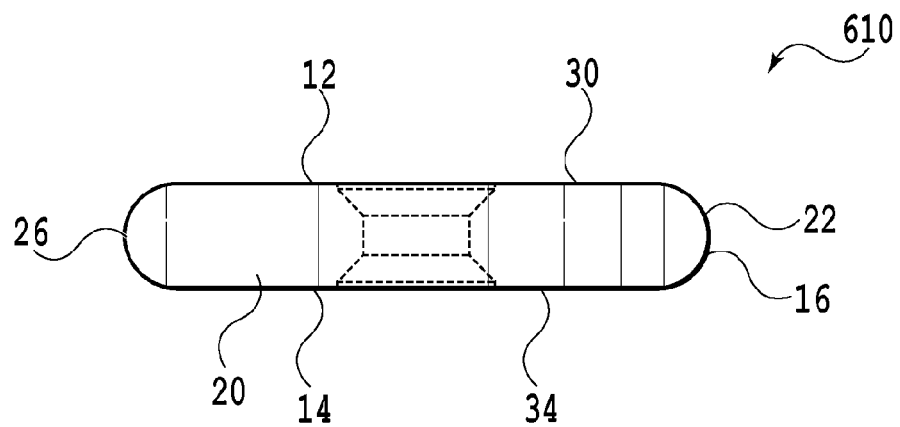
FIG. 24 is a side view of the cutting insert in FIG. 23.

For example, a part of the long side surface of the cutting insert (see an S2 part in FIG. 18) which extends between the second curve portion (corresponding portion) of the long side portion of the upper surface and the second curve portion (corresponding portion) of the long side portion of the lower surface may be allowed to function as an abutment surface portion of the cutting insert. In this case, a protruding abutted portion S3 which comes into abutting contact with the abutment surface portion S2 of the cutting insert may be formed on the side wall surface 60d of the insert mounting seat (see FIG. 19). FIG. 20 illustrates that the abutment surface portion S2 of the cutting insert is brought into abutting contact with the protruding abutted portion S3 of the insert mounting seat 60a and that the cutting insert 410 is screwed in the tool body 52 with a mounting screw and thus mounted therein.

When the approximate involute curve is formed of two curve portions (the first curve portion of the first radius of curvature R1 and the second curve portion of the second radius of curvature R2) and if the above-mentioned side surface configuration of the insert mounting seat is adopted, the curve portion of the second radius of curvature R2 is preferably longer than the curve portion of the first radius of curvature R1. The reason is as follows. When the cutting insert is mounted in the insert mounting seat, a part of the cutting insert which is related to the curve portion with the second radius of curvature R2 is in abutting relation with the side wall surface of the insert mounting seat. Thus, increased length of the curve portion with the second radius of curvature R2 allows an increase in the area in which the cutting insert is in abutting contact with the tool body. This enables the cutting insert to be more appropriately fixed.

The plurality of embodiments have been described. However, the combination of the cutting insert and the tool body is not limited to the combinations described in the embodiments. That is, the cutting insert 10 according to the first embodiment may be applied to a gear cutter which carries out gear cutting using only one type of cutting insert. Furthermore, the cutting insert 210 according to the fourth embodiment may be applied to a gear cutter which carries out gear cutting using a plurality of types of cutting inserts.

As described above, the cutting insert according to the present invention includes the cutting edges formed at the edges of the upper and lower surfaces but does not require that the upper and lower surfaces themselves, which can function as seating surfaces, be curved so as to conform to the curve shape of the cutting edges. This eliminates the need to shape the bottom wall surface of the insert mounting seat in the tool body like the involute curve or a particular curve shape, as in the case where the conventional cutting insert for gear cutting is simply used as a double-sided cutting insert. This enables a significant reduction in the total cost for gear cutting. At the same time, it suffices to form the bottom wall surface of the insert mounting seat into a simple shape such as a flat shape. This allows the bottom wall surface of the insert mounting seat to be precisely processed. Hence, the cutting insert according to the present invention can be more easily fixed in the insert mounting seat using mechanism means such as a clamping screw. As a result, the cutting insert can be substantially stably seated.

The cutting insert and cutting tool with the cutting edges of the cutting insert shaped like protruding curves so as to project outward have been described. However, the curve shape of the cutting edges may be recessed inward of the cutting insert as in the case of a cutting insert 510 according to a seventh embodiment and a cutting insert 610 according to an eighth embodiment which are shown in FIG. 21 to FIG. 24. The cutting insert 510 in FIG. 21 and FIG. 22 has a correspondence relation with the cutting insert 10 according to the first embodiment. The cutting insert 610 in FIG. 23 and FIG. 24 has a correspondence relation with the cutting insert 210 according to the fourth embodiment. Cutting with cutting edges shaped like a recessed curve allows the formation of teeth which can engage with teeth formed using the cutting insert according to any of the above-described embodiments. That is, teeth, each with a protruding side surface instead of a recessed side surface, in other words, teeth, each shaped like the reversed involute curve, can be formed. Of course, even such cutting inserts allows the above-described effects characteristic of the present invention to be exerted.

Figure 25:
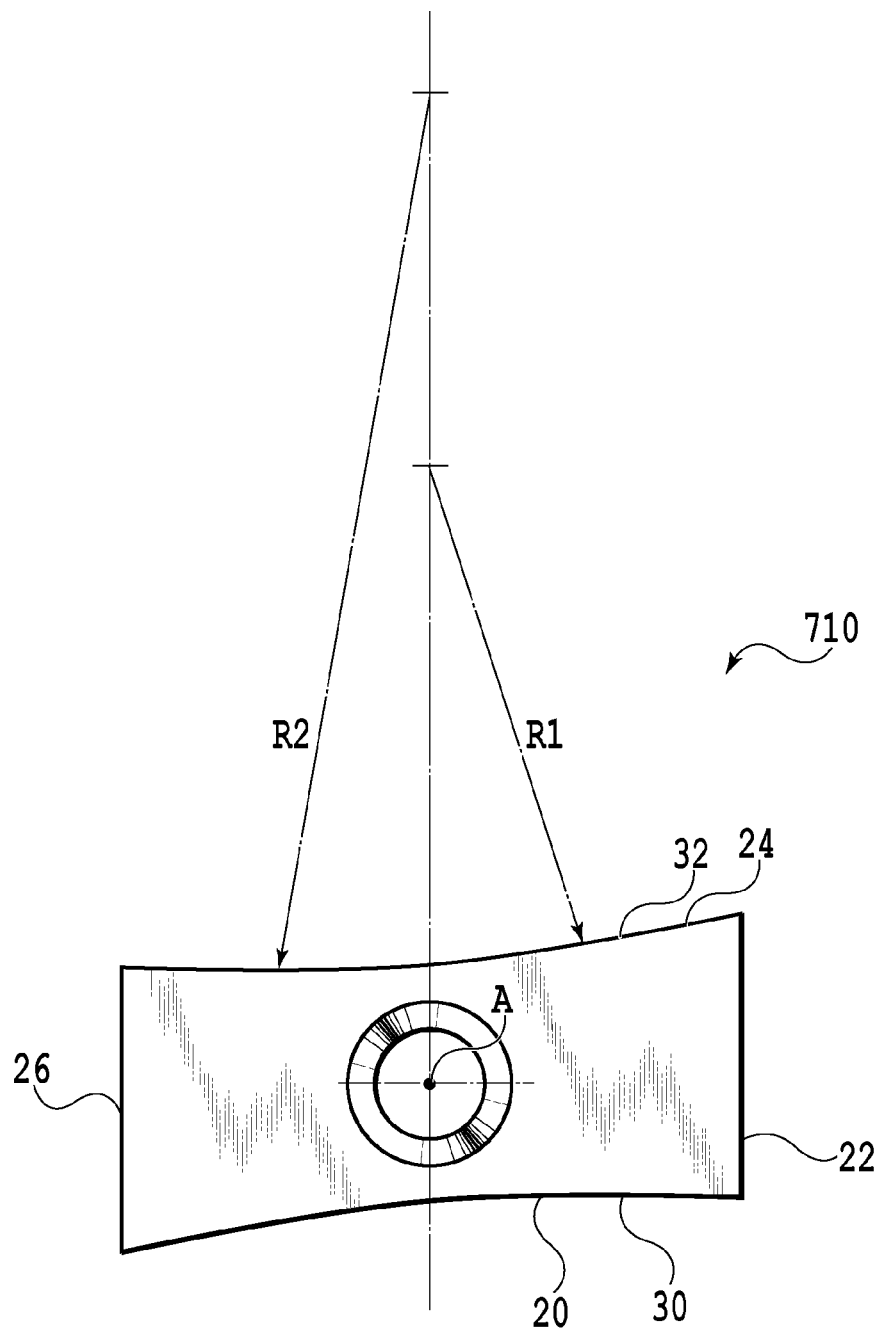
FIG. 25 is a top view of a cutting insert according to a ninth embodiment of the present invention.
Figure 26:
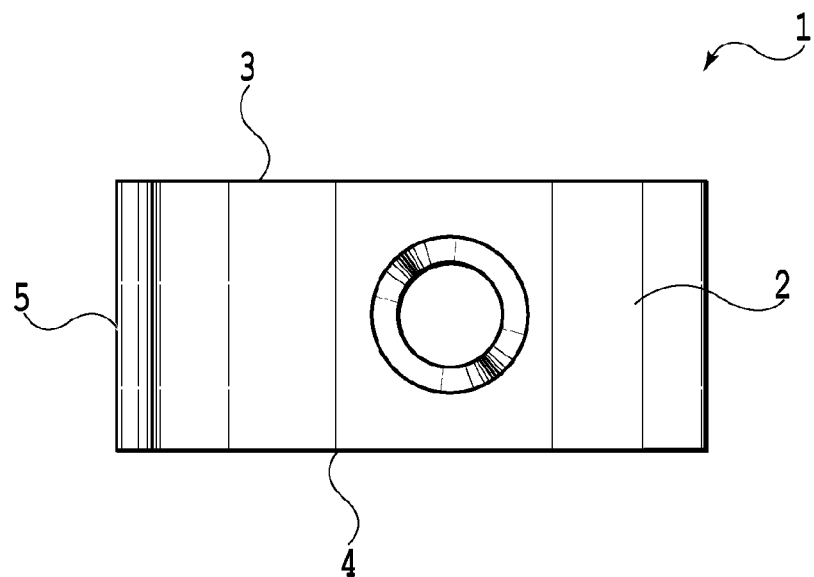
FIG. 26 is a top view of a conventional cutting insert.
Figure 27:
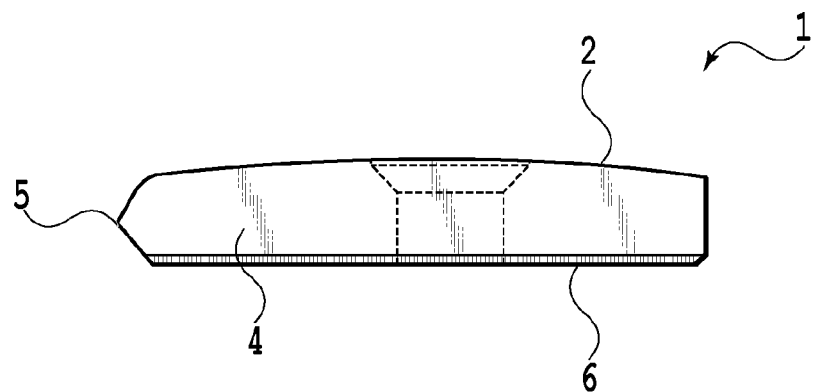
FIG. 27 is a side view of the cutting insert in FIG. 26.
Figure 28:
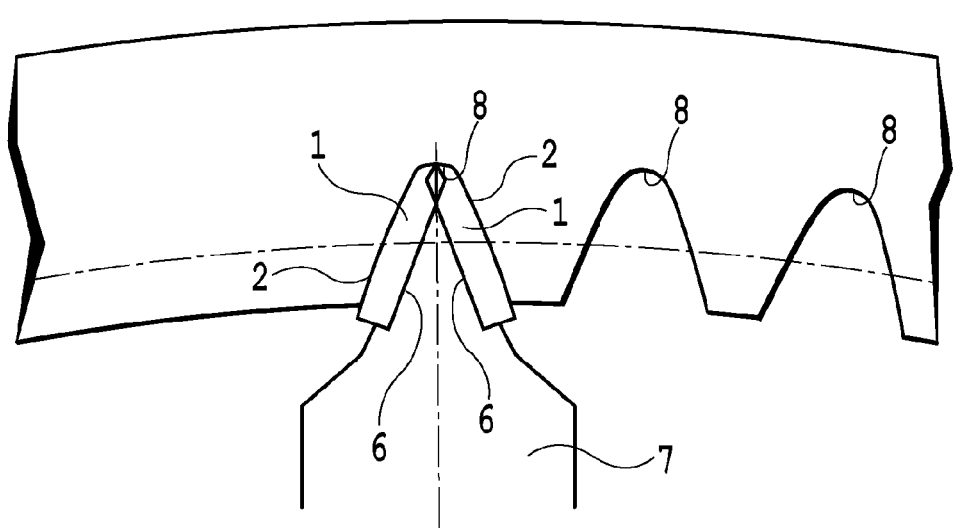
FIG. 28 is a schematic diagram showing how a rotary cutting tool with the cutting insert in FIG. 26 mounted therein forms a gear by cutting.

Even in this case, the recessed curve shape of the cutting edge may be formed by coupling a plurality of curve portions with different curvatures, particularly two such curve portions together. As an example of such a cutting insert, FIG. 25 illustrates a cutting insert 710 according to the ninth embodiment. The cutting insert 710 in FIG. 25 is a variation of the cutting insert shown in FIG. 21. Referring to FIG. 25, in the cutting insert 710, when one curve portion of the two curve portions of the curve shape of the cutting edge (first curve portion) is assumed to have a first radius of curvature R1, the other curve portion (second curve portion) preferably has a second radius of curvature R2 which is 1.2 R1 or more and is less than 2.3 R1. This is because when the ratio of the radii of curvature of the two curve portions falls out of this range, the degree of approximation of the involute curve decreases, thus reducing processing precision. That is, this range is the desirable numerical range which enables the cutting insert to be appropriately fixed, while simultaneously allowing processing precision to be increased by approximation of the involute curve. In the cutting insert 710, the first curve portion of the cutting edge with the first radius of curvature R1 is also positioned closer to the tip of the cutting edge than the second curve portion of the same cutting edge with the second radius of curvature R2, as in the case of the cutting insert 410.

Furthermore, the cutting insert according to the present invention is not limited to the use for gear cutting. The cutting insert according to the present invention can be used for another type of cutting intended to curve the worked side surface of the workpiece to be processed. That is, the curved edges of the upper surface and the lower surface, that is, the cutting edges, need not have a curve shape intended to allow the involute curve to be transferred to the workpiece.

The present invention has been described somewhat specifically with reference to the above-described embodiments. However, the present invention is not limited to the above-described embodiments. It should be appreciated that various alterations and changes may be made to the present invention without departing from the spirit and scope of the invention set forth in the claims. That is, the present invention includes any variations, applications, and equivalents embraced in the concepts of the present invention defined by the claims.

What is claimed is:

1. A gear cutting insert comprising a first end surface and a second end surface which are located opposite each other and a peripheral side surface extending between the first end surface and the second end surface, the peripheral side surface comprising two opposing long side surface portions connected to two opposing short side surface portions, the cutting insert comprising an axis defined therein which extends so as to penetrate the first end surface and the second end surface, the cutting insert comprising:

two first cutting edges with a curve shape in a top view of the cutting insert, one first cutting edge being formed so as to extend along an intersecting ridge portion between the first end surface and one long side surface portion of the two long side surface portions and in such a manner that the one long side surface portion functions as a rake face, the other first cutting edge being formed so as to extend along an intersecting ridge portion between the first end surface and the other long side surface portion of the two long side surface portions and in such a manner that the other long side surface portion functions as a rake face, each of the first cutting edges being formed on the intersecting ridge portion between the first end surface and an associated long side surface portion so as to curve in a direction orthogonal to the axis; and two second cutting edges with a curve shape in a bottom view of the cutting insert, one second cutting edge being formed so as to extend along an intersecting ridge portion between the second end surface and one long side surface portion of the two long side surface portions and in such a manner that the one long side surface portion functions as a rake face, the other second cutting edge being formed so as to extend along an intersecting ridge portion between the second end surface and the other long side surface portion of the two long side surface portions and in such a manner that the other long side surface portion functions as a rake face, each of the second cutting edges being formed on the intersecting ridge portion between the second end surface and an associated long side surface portion so as to curve in the direction orthogonal to the axis; wherein:

in said top or bottom view, each of the cutting edges has either a protruding curve shape or a recessed curve shape, along its entire length;

in a top view of the cutting insert, the cutting edges form the outermost portions of the long side surface portions, along their entire length; and each of the cutting edges lays on a plane that is orthogonal to the axis.

2. The cutting insert according to claim 1, wherein the first cutting edges are formed so as to have a first predetermined curve shape when the cutting insert is seen from a side opposite to the first end surface, and the second cutting edges are formed so as to have a second predetermined curve shape when the cutting insert is seen from a side opposite to the second end surface.

3. The cutting insert according to claim 1, wherein one of the first cutting edges and one of the second cutting edges associated with each other via a common long side surface portion of the two long side surface portions are arranged plane-symmetrically.

4. The cutting insert according to claim 1, wherein each of the first cutting edges and the second cutting edges is shaped like a protruding curve shape so as to project outward.

5. The cutting insert according to claim 1, wherein each of the first cutting edges and the second cutting edges is shaped like a recessed curve shape so as to be recessed inward.

6. The cutting insert according to claim 1, wherein each of the first cutting edges and the second cutting edges is formed so as to have an involute curve shape.

7. The cutting insert according to claim 1, wherein each of the first cutting edges and the second cutting edges is formed so as to have a curve shape formed by coupling a plurality of curve portions with different curvatures together.

8. The cutting insert according to claim 7, wherein
each of the first cutting edges and the second cutting edges is at least partly formed so as to have a protruding curve shape formed by coupling a first curve portion and a second curve portion together, and
when the first curve portion has a first radius of curvature R1, the second curve portion has a second radius of curvature R2 which is 0.4 R1 or more and is less than 1.0 R1.

9. The cutting insert according to claim 8, wherein the second curve portion is longer than the first curve portion.

10. The cutting insert according to claim 7, wherein
each of the first cutting edges and the second cutting edges is at least partly formed so as to have a recessed curve shape formed by coupling a first curve portion and a second curve portion together, and
when the first curve portion has a first radius of curvature R1, the second curve portion has a second radius of curvature R2 which is 1.2 R1 or more and is less than 2.3 R1.

11. The cutting insert according to claim 10, wherein the second curve portion is longer than the first curve portion.

12. The cutting insert according to claim 1, wherein a recessed portion is formed in the peripheral side surface.

13. A rotary gear cutting tool comprising a tool body with first and second side end surfaces located opposite each other, and a middle plane (M) between the two side end surfaces, the tool body being configured to rotate around an axis of rotation (0) which is orthogonal to the middle plane (M), the cutting tool comprising:
a first insert mounting seat disposed in the tool body principally on one side of the middle plane (M) and having a first cutting insert according to claim 1 mounted therein; and
a second insert mounting seat disposed in the tool body principally on the other side of the middle plane (M) and having a second cutting insert according to claim 1 mounted therein.

14. The rotary cutting tool according to claim 13,
wherein the first end surface of the first cutting insert functions as an insert seating surface which comes into abutting contact with a bottom wall surface of the first insert mounting seat;
wherein the second end surface of the second cutting insert functions as an insert seating surface which comes into abutting contact with a bottom wall surface of the second insert mounting seat, and
wherein the bottom wall surface of the first insert mounting seat is formed at a first predetermined inclination to the middle plane (M) and the bottom wall surface of the second insert mounting seat is formed at a second predetermined inclination to the middle plane (M).

15. The rotary cutting tool according to claim 14,
wherein in each cutting insert, each of the first cutting edge and the second cutting edge is formed so as to have a curve shape formed by coupling a plurality of curve portions with different curvatures together, and a part of each long side surface portion extending between a curve portion of the first cutting edge and a curve portion of the second cutting edge functions as an abutment surface portion, and
wherein the abutment portion of each cutting insert is in abutting contact with a protruding abutted portion formed on a side wall surface of a corresponding one of the first insert mounting seat and the second insert mounting seat.

16. The rotary cutting tool according to claim 14, wherein:
in each of the first and second cutting inserts, a recessed portion is formed in the peripheral side surface, and
a projecting portion is formed on a side wall surface of each of the first and second insert mounting seats, the projection portion being engaged to the recessed portion of a corresponding one of the first and second cutting inserts.

17. A gear cutting insert comprising:
an upper surface and a lower surface which are located opposite each other; and
a peripheral side surface extending between the upper and lower surfaces, the peripheral side surface comprising a first pair of opposing long side surface portions and a second pair of opposing short side surface portions, the second pair of opposing short side surface portions connecting to the first pair of opposing long side surface portions;
an axis penetrating the upper and lower surfaces;
two curved upper cutting edges extending on a plane orthogonal to the axis and being visible in a plan view of the upper surface, the two curved upper cutting edges including:
a first curved upper cutting edge extending along an intersecting ridge portion between the upper surface and a first member of the first pair of long side surface portions such that said first member functions as a rake face for the first curved upper cutting edge;
a second curved upper cutting edge extending along an intersecting ridge portion between the upper surface and a second member of the first pair of long side surface portion such that said second member functions as a rake face for the second curved upper cutting edge;
two curved lower cutting edges extending on a plane orthogonal to the axis and being visible in a plan view of the lower surface, the two curved lower cutting edges including:
a first curved lower cutting edge extending along an intersecting ridge portion between the lower surface and the first member of the first pair of long side surface portions such that said first member functions as a rake surface for the first curved lower cutting edge; and
a second curved lower cutting edge extending along an intersecting ridge portion between the lower surface and the second member of the first pair of long side surface portions such that said second member functions as a rake surface for the second curved lower cutting edge; wherein:
in said plan view of the upper or lower surface, each of the cutting edges has either a protruding curve shape or a recessed curve shape, along its entire length;

in a top view of the cutting insert, the cutting edges form the outermost portions of the long side surface portions, along their entire length; and each of the cutting edges lays on a plane that is orthogonal to the axis.

18. The cutting insert according to claim 17, wherein each of the upper and lower cutting edges is formed so as to have a curve shape formed by coupling a plurality of curve portions with different curvatures together.

19. The cutting insert according to claim 18, wherein each of the upper and lower cutting edges is at least partly formed so as to have a protruding curve shape formed by coupling a first curve portion and a second curve portion together, and when the first curve portion has a first radius of curvature R1, the second curve portion has a second radius of curvature R2 which is 0.4 R1 or more and is less than 1.0 R1.

20. The cutting insert according to claim 19, wherein the second curve portion is longer than the first curve portion.

21. The cutting insert according to claim 18, wherein each of the upper and lower cutting edges is at least partly formed so as to have a recessed curve shape formed by coupling a first curve portion and a second curve portion together, and when the first curve portion has a first radius of curvature R1, the second curve portion has a second radius of curvature R2 which is 1.2 R1 or more and is less than 2.3 R1.

22. The cutting insert according to claim 21, wherein the second curve portion is longer than the first curve portion.

23. A gear cutting insert comprising a first end surface and a second end surface which are located opposite each other and a peripheral side surface extending between the first end surface and the second end surface and comprising two side surface portions, the cutting insert comprising an axis defined therein which extends so as to penetrate the first end surface and the second end surface, the cutting insert comprising:

two first cutting edges with a curve shape in a top view of the insert, one first cutting edge being formed so as to extend along an intersecting ridge portion between the first end surface and one side surface portion of the two side surface portions and in such a manner that the one side surface portion functions as a rake face, the other first cutting edge being formed so as to extend along an intersecting ridge portion between the first end surface and the other side surface portion of the two side surface portions and in such a manner that the other side surface portion functions as a rake face, each of the first cutting edges being formed on the intersecting ridge portion between the first end surface and an associated side surface portion so as to curve in a direction orthogonal to the axis; and two second cutting edges with a curve shape in a bottom view of the insert, one second cutting edge being formed so as to extend along an intersecting ridge portion between the second end surface and one side surface portion of the two side surface portions and in such a manner that the one side surface portion functions as a rake face, the other second cutting edge being formed so as to extend along an intersecting ridge portion between the second end surface and the other side surface portion of the two side surface portions and in such a manner that the other side surface portion functions as a rake face, each of the second cutting edges being formed on the intersecting ridge portion between the second end surface and an associated side surface portion so as to curve in the direction orthogonal to the axis; wherein:

in said top or bottom view, each of the cutting edges has either a protruding curve shape or a recessed curve shape, along its entire length;

in a top view of the cutting insert, the cutting edges form the outermost portions of the side surface portions, along their entire length;

each of the cutting edges lays on a plane that is orthogonal to the axis; and each of the first cutting edges and the second cutting edges is formed so as to have either:

(a) an involute curve shape; or (b) a curve shape formed by coupling a plurality of curve portions with different curvatures together.

\* \* \* \* \*